United States Patent
Porta

(10) Patent No.: US 11,488,398 B2
(45) Date of Patent: Nov. 1, 2022

(54) DETECTING ILLEGAL USE OF PHONE TO PREVENT THE DRIVER FROM GETTING A FINE

(71) Applicant: Ambarella International LP, Santa Clara, CA (US)

(72) Inventor: Pier Paolo Porta, Fidenza (IT)

(73) Assignee: Ambarella International LP, Santa Clara, CA (US)

( * ) Notice: Subject to any disclaimer, the term of this patent is extended or adjusted under 35 U.S.C. 154(b) by 283 days.

(21) Appl. No.: 16/578,634

(22) Filed: Sep. 23, 2019

(65) Prior Publication Data

US 2021/0012126 A1 Jan. 14, 2021

(30) Foreign Application Priority Data

Jul. 10, 2019 (IT) .......................... 102019000011403

(51) Int. Cl.
*G06V 20/59* (2022.01)
*B60Q 9/00* (2006.01)
(Continued)

(52) U.S. Cl.
CPC ....... *G06V 20/597* (2022.01); *B60H 1/00285* (2013.01); *B60H 1/00742* (2013.01); *B60H 1/00878* (2013.01); *B60Q 9/00* (2013.01); *G06K 9/6288* (2013.01); *G06V 10/95* (2022.01); *G06V 20/593* (2022.01); *G06V 40/171* (2022.01);
(Continued)

(58) Field of Classification Search
USPC ............ 382/103, 104, 115; 340/576; 701/36
See application file for complete search history.

(56) References Cited

U.S. PATENT DOCUMENTS 8,437,513 B1 * 5/2013 Derakhshani ............ G06K 9/00
382/117
10,684,626 B1 * 6/2020 Martin .................. G06V 20/582
(Continued)

OTHER PUBLICATIONS

Berri Rafael, A hybrid vision system for detecting use of mobile phones while driving, 2016 International Joint Conference on Neural Networks (IJCNN) IEEE, Jul. 24, 2016 (Jul. 24, 2016), pp. 4601-4610.

(Continued)

*Primary Examiner* — Kathleen Y Dulaney
(74) *Attorney, Agent, or Firm* — Christopher P. Maiorana, PC

(57) ABSTRACT

An apparatus includes an interface and a processor. The interface may be configured to receive video frames corresponding to an interior of a vehicle. The processor may be configured to perform video operations on the video frames to detect objects in the video frames, detect a driver based on the objects detected in the video frames, detect a use of an electronic device by the driver and generate a notification signal. The notification signal may be configured to warn the driver about using the electronic device in the vehicle. The notification signal may be generated if the use of the electronic device is unauthorized. The processor may comprise a dedicated hardware module configured to perform feature detection to calculate descriptors for determining a likelihood that pixels of the video frames belong to the objects that correspond to the use of the electronic device by the driver.

19 Claims, 12 Drawing Sheets

(51) Int. Cl.

| | | |
|---|---|---|
| *G06K 9/62* | (2022.01) | |
| *H04W 68/02* | (2009.01) | |
| *B60H 1/00* | (2006.01) | |
| *G06V 10/94* | (2022.01) | |
| *G06V 40/20* | (2022.01) | |
| *G06V 40/16* | (2022.01) | |
| *B60R 11/04* | (2006.01) | |

(52) U.S. Cl.
CPC ............ *G06V 40/172* (2022.01); *G06V 40/20* (2022.01); *H04W 68/02* (2013.01); *B60R 11/04* (2013.01); *G06V 2201/07* (2022.01)

(56) References Cited

U.S. PATENT DOCUMENTS

| | | | | |
|---|---|---|---|---|
| 2003/0220725 | A1* | 11/2003 | Harter, Jr. | ............ B60R 16/0231 |
| | | | | 701/1 |
| 2006/0125919 | A1* | 6/2006 | Camilleri | ............... H04N 7/183 |
| | | | | 348/148 |
| 2012/0133528 | A1* | 5/2012 | Lee | ........................ A61B 3/113 |
| | | | | 340/945 |
| 2015/0186715 | A1* | 7/2015 | Zhao | .................... G06V 40/103 |
| | | | | 382/103 |
| 2015/0286885 | A1* | 10/2015 | Bulan | .................. G06V 20/597 |
| | | | | 382/104 |
| 2015/0310253 | A1* | 10/2015 | Agrawal | ................. G06F 3/013 |
| | | | | 382/103 |
| 2016/0046298 | A1* | 2/2016 | DeRuyck | ............. G06V 20/597 |
| | | | | 340/576 |
| 2016/0117546 | A1* | 4/2016 | Rosales | ................ G06V 20/597 |
| | | | | 382/103 |
| 2016/0214618 | A1* | 7/2016 | Wulf | ........................ B60Q 9/00 |
| 2016/0371535 | A1* | 12/2016 | Li | ........................ G06K 9/00288 |
| 2018/0032857 | A1* | 2/2018 | Lele | ..................... G06N 3/0454 |
| 2018/0072321 | A1* | 3/2018 | Mueller | ............ H04B 17/0082 |
| 2018/0288182 | A1* | 10/2018 | Tong | .................... G06V 20/597 |
| 2019/0147262 | A1* | 5/2019 | Kuehnle | ................ G07C 5/008 |
| | | | | 340/439 |
| 2019/0299999 | A1* | 10/2019 | Liu | ........................ A61B 5/7267 |
| 2019/0367029 | A1* | 12/2019 | Martinez Ruvalcaba | .................... |
| | | | | B60W 50/087 |
| 2019/0377957 | A1* | 12/2019 | Johnston | ................ G06V 20/46 |
| 2020/0057487 | A1* | 2/2020 | Sicconi | .................... G06T 7/254 |
| 2020/0079288 | A1* | 3/2020 | Yamamoto | ........... G08B 21/182 |
| 2020/0151019 | A1* | 5/2020 | Yu | ........................... G06N 3/08 |
| 2020/0167893 | A1* | 5/2020 | Gupta | .................. G06K 9/4628 |
| 2020/0231173 | A1* | 7/2020 | Mueller-Tomfelde | ...................... |
| | | | | G06V 20/597 |

OTHER PUBLICATIONS

Wang Dan, Detecting Driver Use of Mobile Phone Based on In-Car Camera, 2014 Tenth International Conference on Computational Intelligence and Security, IEEE, Nov. 15, 2014 (Nov. 15, 2014), pp. 148-151.

Le T Hoang Ngan, Multiple Scale Faster-RCNN Approach to Driver's Cell-Phone Usage and Hands on Steering Wheel Detection, 2016 IEEE Conference on Computer Vision and Pattern Recognition Workshops (CVPRW), IEEE, Jun. 26, 2016 (Jun. 26, 2016), pp. 46-53.

Jie Yang, Detecting driver phone use leveraging car speakers, Proceedings of the 17th Annual International Conference on Mobile Computing and Networking. MOBICOM '11, vol. 23, Sep. 19, 2011 (Sep. 19, 2011), p. 1-12.

* cited by examiner

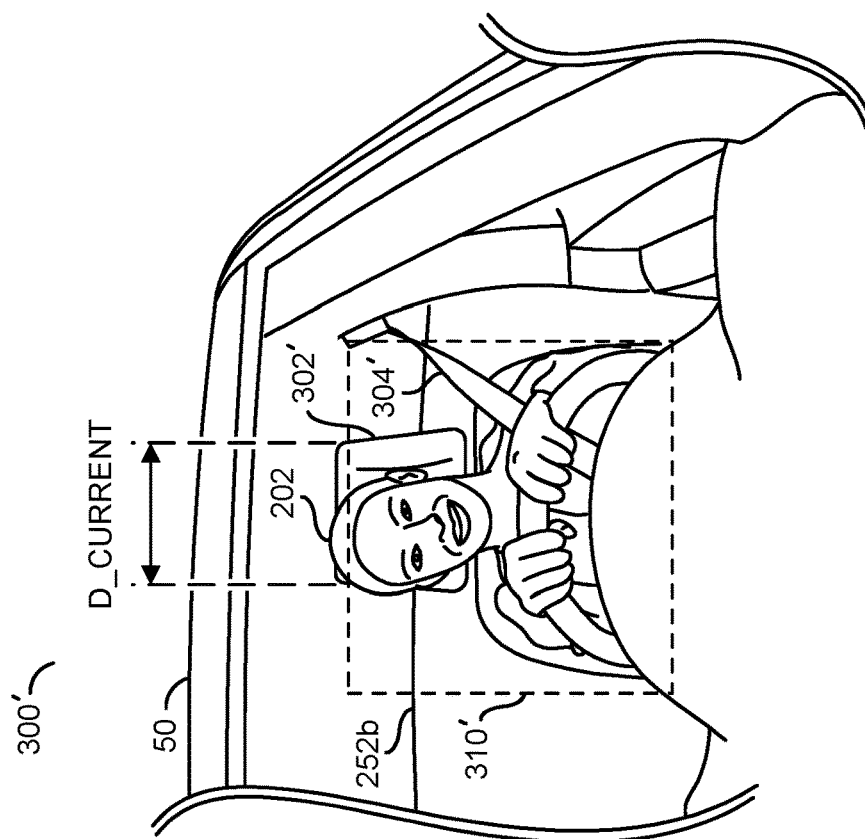
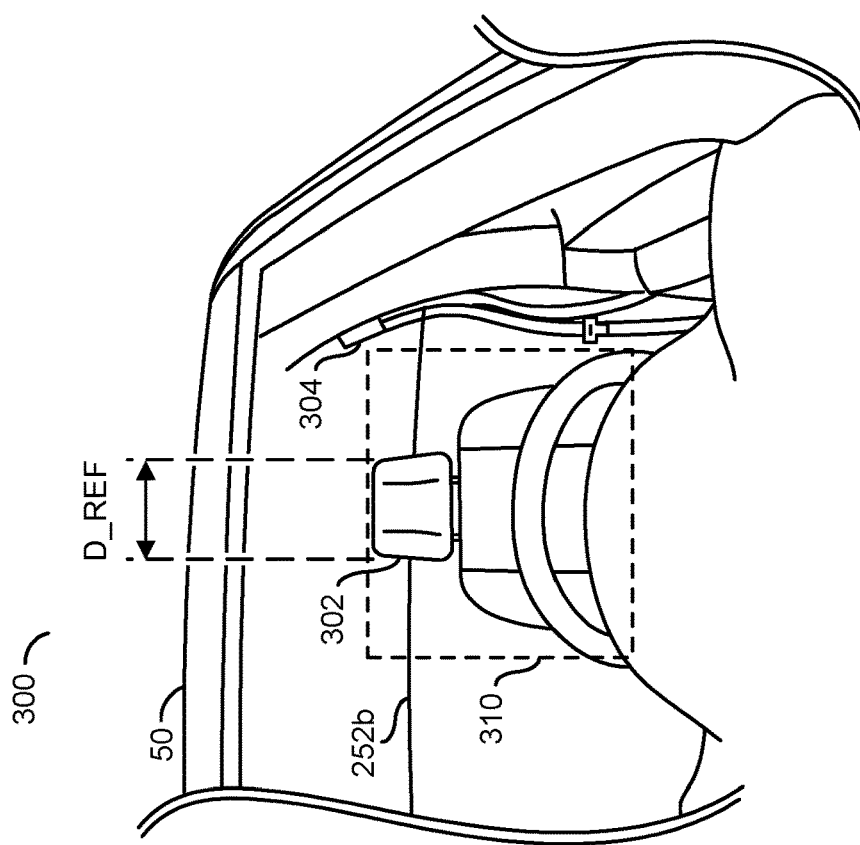
FIG. 4

DETECTING ILLEGAL USE OF PHONE TO PREVENT THE DRIVER FROM GETTING A FINE

This application relates to Italian Application No. 102019000011403, filed Jul. 10, 2019, which is hereby incorporated by reference in its entirety.

FIELD OF THE INVENTION

The invention relates to computer vision generally and, more particularly, to a method and/or apparatus for implementing detecting illegal use of phone to prevent the driver from getting a fine.

BACKGROUND

Mobile phone usage is increasingly becoming a factor in vehicle collisions. While it is well known that usage of mobile phones are a distraction to drivers, many drivers still take the risk of using a mobile phone while driving. Many locations have laws against distracted driving. If a police officer catches a driver using a mobile phone, the driver may be fined or get a license suspension. Even with police enforcement mobile phone usage while driving persists.

It would be desirable to implement detecting illegal use of phone to prevent the driver from getting a fine.

SUMMARY

The invention concerns an apparatus comprising an interface and a processor. The interface may be configured to receive video frames corresponding to an interior of a vehicle. The processor may be configured to perform video operations on the video frames to detect objects in the video frames, detect a driver based on the objects detected in the video frames, detect a use of an electronic device by the driver and generate a notification signal. The notification signal may be configured to warn the driver about using the electronic device in the vehicle. The notification signal may be generated if the use of the electronic device is unauthorized. The processor may comprise a dedicated hardware module configured to perform feature detection to calculate descriptors for determining a likelihood that pixels of the video frames belong to the objects that correspond to the use of the electronic device by the driver.

BRIEF DESCRIPTION OF THE FIGURES

Embodiments of the invention will be apparent from the following detailed description and the appended claims and drawings in which:

FIG. 4 is a diagram illustrating an object comparison between a reference video frame and a captured video frame.

DETAILED DESCRIPTION OF THE EMBODIMENTS

Embodiments of the present invention include providing detecting illegal use of phone to prevent the driver from getting a fine that may (i) implement computer vision to monitor a driver, (ii) distinguish between a driver and other vehicle passengers, (iii) infer smartphone usage based on driver behavior, (iv) distinguish mouth movements for phone use from conversation with another passenger, (v) monitor for texting and/or other distractions and/or (vi) be implemented as one or more integrated circuits.

Embodiments of the invention may be configured to implement computer vision operation on video frames to detect cell phone usage while driving. In some embodiments, a notification signal may be generated to warn the driver that cell phone usage has been detected. Providing a warning and/or notification to the driver may help improve road safety by reducing distracted driving. Furthermore, providing a warning may prevent the driver from being fined because of illegal and/or unauthorized phone use. For example, the notification may provide a warning to stop unauthorized cell phone use instead of receiving a punishment (e.g., in the form of a fine and/or license suspension that may be received when pulled over by a police officer). Furthermore, implementing computer vision may provide immediate feedback and/or continuous monitoring (e.g., compared to law enforcement, which may be limited to stopping drivers that are seen by traffic enforcement officers).

The video frames may be captured by one or more video cameras directed to the interior of a vehicle. The computer vision operations may be performed on the captured video frames to detect the smartphone being held by the driver. In some embodiments, the computer vision operations may perform various heuristics to infer whether the smartphone is being used. The heuristics may be based on the behavior of the driver.

In one example, even if the smartphone is not visible, the computer vision operations may detect whether the hand of the driver is close to the ear (e.g., a common position when talking on the phone). The computer vision operations may be configured to detect how long the hand has been held to the ear (e.g., distinguish between other behaviors such as resting a hand on the head, or scratching at the head). In one example, if the hand has been placed near the ear for a threshold amount of time (e.g., TS) then the inference may be made that the driver is talking on the phone.

Other types of behavior may be detected. For example, the movements of the head and/or face may be analyzed. Detecting mouth movements may be used to infer that the driver is speaking. Other movements of the head, such as nodding may be detected.

Embodiments of the invention may be configured to aggregate various detections made using the computer vision operations. If enough evidence has been detected to infer that the driver is using the cell phone while driving, a warning may be issued.

Figure 1:
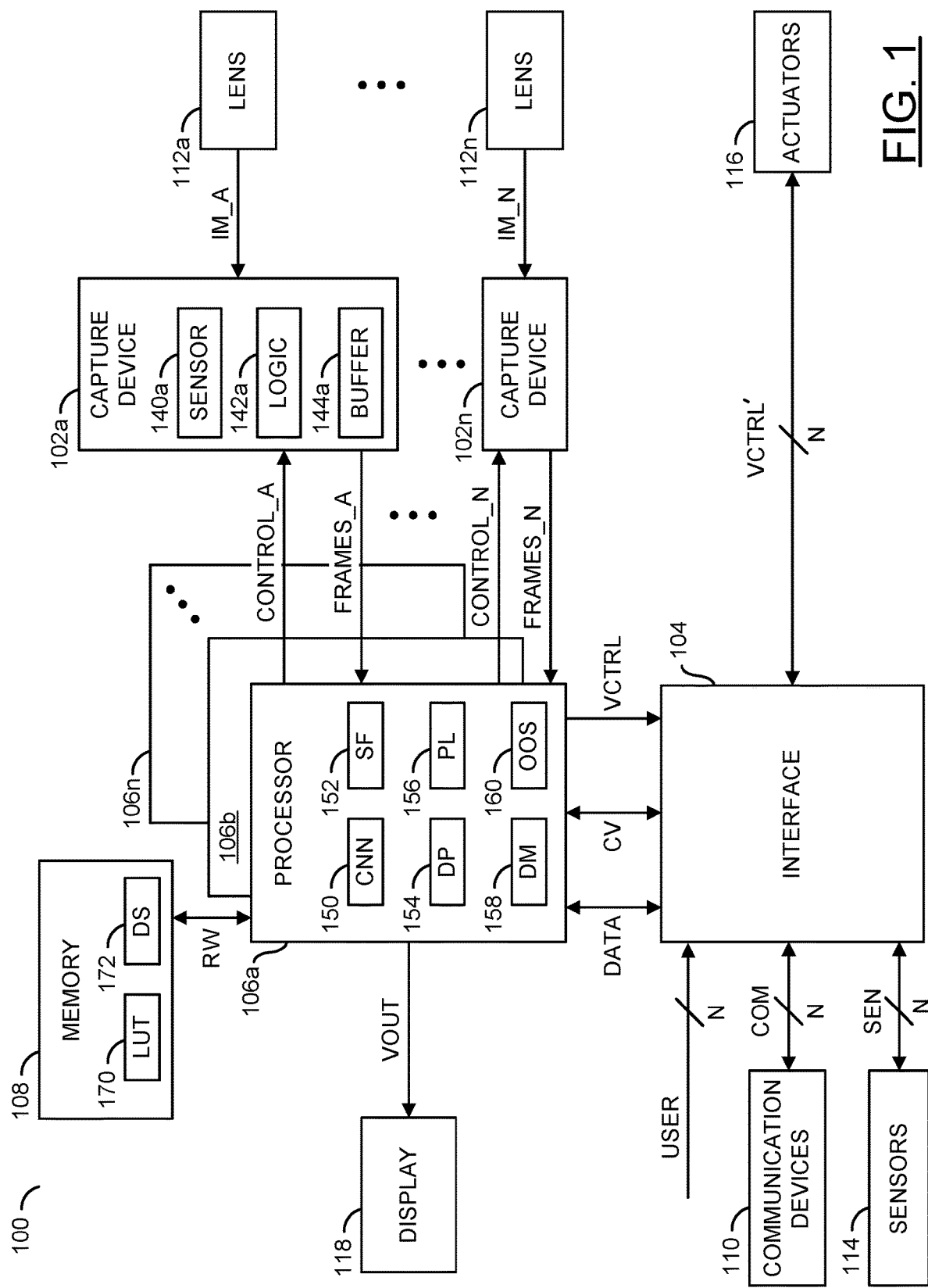
FIG. 1 is a diagram illustrating an embodiment of the present invention.

Referring to FIG. 1, a diagram illustrating an embodiment of the present invention 100 is shown. The apparatus 100 generally comprises and/or communicates with blocks (or circuits) 102a-102n, a block (or circuit) 104, blocks (or circuits) 106a-106n, a block (or circuit) 108, a block (or circuit) 110, blocks (or circuits) 112a-112n, a block (or circuit) 114, a block (or circuit) 116 and/or a block (or circuit) 118. The circuits 102a-102n may each implement a capture device. The circuits 104 may implement an interface circuit. The circuits 106a-106n may each implement a processor (or co-processors). In an example implementation, the circuits 106a-106n may each be implemented as a video processor and/or a computer vision processor. The circuit 108 may implement a memory. The circuit 110 may implement one or more communication devices. The blocks 112a-112n may implement lenses. The circuit 114 may implement one or more vehicle sensors. The circuit 116 may implement one or more vehicle actuators. The circuit 118 may implement a display. The apparatus 100 may comprise other components (not shown). The number, type and/or arrangement of the components of the apparatus 100 may be varied according to the design criteria of a particular implementation.

In various embodiments of the apparatus 100, the components 102a-118 may be implemented as a distributed camera system 100. In the distributed system embodiment of the apparatus 100, each component may be implemented separately throughout an installation location (e.g., such as a vehicle). In some embodiments of the apparatus 100, the components 102a-118 may be implemented on a printed circuit board (e.g., a single module). In the single module embodiment, each component may be connected to a single module (e.g., such as a circuit board on a small device such as a drone). In some embodiments, some of the components 102a-118 may be implemented on a single module and some of the components 102a-118 may be distributed throughout the installation location. For example, the apparatus 100 may be implemented as a drop-in solution (e.g., installed as one component). In some embodiments, the apparatus 100 may be a device that may be installed as an after-market product for a vehicle (e.g., a retro-fit for a vehicle). In some embodiments, one or more of the components 102a-118 may be components separate from the apparatus 100 that may be accessed by the interface 104 and/or the processors 106a-106n.

In some embodiments, the apparatus 100 may implement one of the processors 106a-106n. In some embodiments, the apparatus 100 may implement multiple processors 106a-106n. For example, the processors 106a may have multiple co-processors 106b-106n. Similarly, the interface 104 may be implemented as multiple interfaces each supporting different communication protocols. In another example, the communication devices 110 may be implemented as many modules, each implementing a different communications standard (e.g., Bluetooth, Wi-Fi, LTE, etc.). In some embodiments, the one or more of the components 102a-118 may be implemented as part of another one of the components 102a-118. For example, the memory 108 may be implemented as a component of the processors 106a-106n. In another example, the lenses 112a-112n and the capture devices 102a-102n may each be implemented as a respective single assembly. Generally, the apparatus 100 may be implemented as a system-on-chip (SoC).

The lenses 112a-112n (e.g., an optical lens) may be configured to capture a targeted view. Some of the lenses 112a-112n may be implemented to provide a targeted view of an area exterior to an object (e.g., the outside of a car). Some of the lenses 112a-112n may be implemented to provide a targeted view of an interior of an object (e.g., the cabin of a vehicle). The lenses 112a-112n may each capture and/or focus light as input data (e.g., IM_A-IM_N) and present the respective light input data IM_A-IM_N to a respective one of the capture devices 102a-102n.

In embodiments implementing many of the lenses 112a-112n, each of the lenses 112a-112n may point in a different direction. By having each of the lenses 112a-112n capture a different direction, the apparatus 100 may capture a panoramic view of the environment and/or the interior of a vehicle. The lenses 112a-112n may be arranged to capture fields of view above and/or below a level of the vehicle. In some embodiments, lenses 112a-112n may be implemented having a wide angle (or fisheye) lens. The panoramic video may comprise a large field of view generated by one or more lenses/camera sensors. One example of a panoramic video may be a 360 equirectangular video. Equirectangular video may also be called spherical panoramas. Panoramic video may be a video that provides a field of view that is larger than the field of view that may be displayed on a device used to playback the video (e.g., the display 118).

Each of the capture devices 102a-102n may comprise one of blocks (or circuits) 140a-140n, one of blocks (or circuits) 142a-142n and/or one of blocks (or circuits) 144a-144n. The blocks 140a-140n may implement an image sensor (e.g., a camera sensor). The blocks 142a-142n may implement logic. The blocks 144a-144n may implement a buffer. For clarity, in the example shown, only the image sensor 140a, the logic 142a and the buffer 144a of the capture device 102a are shown. The capture devices 102a-102n may each be configured to receive a respective one of the signals IM_A-IM_N, a respective signal (e.g., CONTROL_A-CONTROL_N) and/or present a respective signal (e.g., FRAMES_A-FRAMES_N).

The capture devices 102a-102n may each be configured to generate images and/or video frames in response to the signals IM_A-IM_N (e.g., perform an analog to digital conversion). The capture devices 102a-102n may capture data received through the lenses 112a-112n to generate video image data (e.g., generate video frames). The signals FRAMES_A-FRAMES_N may comprise video frames and/or images generated by the capture devices 102a-102n (e.g., video data). In some embodiments, the capture devices 102a-102n may be configured to perform depth sensing (e.g., the signals FRAMES_A-FRAMES_N may comprise depth information and/or vector light data in addition to the video frames). In one example, the capture devices 102a-102n may perform depth sensing using stereo cameras (e.g., cameras configured as a stereo pair to capture a depth map). In another example, the capture devices 102a-102n may perform depth sensing using time-of-flight. In yet another example, the capture devices 102a-102n may perform depth sensing using structured light. The video frames FRAMES_A-FRAMES_N may be presented to one or more of the processors 106a-106n. The signals CONTROL_A-CONTROL_N may comprise instruction signals for the capture devices 102a-102n and/or the lenses 112a-112n (e.g., to zoom, pan, focus, adjust settings, etc.). The signals CONTROL_A-CONTROL_N may be generated by the processors 106a-106n.

The interface circuit 104 may be configured to transmit and/or receive a number of signals. The interface circuit 104 may be configured to communicate information and/or convert information to/from various protocols. In some embodiments, the interface 104 may be implemented as one of the components of the processors 106a-106n. In some embodiments, the interface 104 may be implemented as a vehicle bus (e.g., a CAN bus). For example, for low speed communication, the vehicle CAN bus may be implemented. In some embodiments, the interface 104 may implement a high speed data transmission protocol (e.g., for video transmission). For example, the interface 104 may implement one or more of Ethernet, PCI-e, MIPI, etc. In some embodiments, the interface 104 may comprise many different components, each configured to communicate using a particular protocol. The implementation of the interface 104 may be varied according to the design criteria of a particular implementation.

In the example shown, the interface 104 may send and/or receive a signal (e.g., DATA), a signal (e.g., CV), a signal (e.g., VCTRL), a signal (e.g., COM), a signal (e.g., SEN), a signal (e.g., VCTRL') and/or a signal (e.g., USER). The signal USER may represent user inputs (e.g., turn signals, pressing the accelerator, pressing the brakes, interactions with an infotainment system, etc.). The signal SEN may represent information related to the vehicle sensors 114 such as calibration data from the processors 106a-106n and/or status information of the vehicle based on sensor readings (e.g., speed, acceleration, temperature, location, gyro orientation, etc.). The signal COM may represent information communicated to/from the communication devices 110. The signal VCTRL and VCTRL' may represent control instructions generated by the processors 106a-106n for the various vehicle actuators 116. The signal CV may represent computer vision data. The signal DATA may represent other data. The number of signals communicated and/or the types of data communicated using the interface 104 may be varied according to the design criteria of a particular implementation.

The processors 106a-106n may each comprise a block (or circuit) 150, a block (or circuit) 152, a block (or circuit) 154, a block (or circuit) 156, a block (or circuit) 158 and/or a block (or circuit) 160. The block 150 may implement a convolutional neural network (CNN) module. The block 152 may implement a sensor fusion module. The block 154 may implement a driving policy module. The block 156 may implement a video processing pipeline module. The block 158 may implement a decision making module. The block 160 may implement an open operand stack module. The processors 106a-106n may comprise other components (not shown). In some embodiments, one or more of the processors 106a-106n may not comprise each of the blocks 150-160. The modules 150-160 may each be implemented as dedicated hardware modules of the processors 106a-106n. The number, type and/or arrangement of the components of the processors 106a-106n may be varied according to the design criteria of a particular implementation.

The processors 106a-106n may be configured to execute computer readable code and/or process information. The processors 106a-106n may each be configured to receive the signals FRAMES_A-FRAMES_N, transmit the signal VCTRL, a signal (e.g., VOUT) and/or send/receive the signal DATA, the signal CV and/or a signal (e.g., RW). The signal VOUT may provide a video data output to the display 118. For example the processors 106a-106n may be configured to generate the video data (e.g., VOUT) for the display 118 (or multiple displays) in response to the video frames (e.g., FRAMES_A-FRAMES_N. The signal RW may communicate data to/from the memory 108. The signal VOUT, the signals CONTROL_A-CONTROL_N, the signal DATA, the signal CV, the signal RW and/or the signal VCTRL may be generated based on one or more decisions made by the processors 106a-106n. The decisions made by the processors 106a-106n may be determined based on data received by the processors 106a-106n and/or based on an analysis of the signals FRAMES_A-FRAMES_N. The processors 106a-106n may implement other signals (not shown). The number and/or type of signals communicated by the processor 106a-106n may be varied according to the design criteria of a particular implementation.

The memory 108 may comprise a block (or circuit) 170 and/or a block (or circuit) 172. The block 170 may implement a look up table. The block 172 may implement data storage. The memory 108 may be configured to store computer readable/executable instructions (or firmware or code). The instructions, when executed by the processors 106a-106n, may perform a number of steps. In some embodiments, the processors 106a-106n may be implemented as a system-on-chip (SoC) and the memory 108 may be a component of the processors 106a-106n. The arrangement and/or type of data stored and/or the memory technology implemented (e.g., NAND, RAM, memristor, etc.) by the memory 108 may be varied according to the design criteria of a particular implementation.

The communication devices 110 may send and/or receive data to/from the apparatus 100. In some embodiments, the communication devices 110 may be implemented as a wireless communications module. In some embodiments, the communication devices 110 may be implemented as a satellite connection to a proprietary system (e.g., to provide advanced driver-assistance systems (ADAS) data and/or telemetry data). In some embodiments, the communication devices 110 may implement GPS and/or GNSS functionality. In one example, the communication device 110 may be a hard-wired data port (e.g., a USB port, a mini-USB port, a USB-C connector, HDMI port, an Ethernet port, a DisplayPort interface, a Lightning port, a Thunderbolt port, a PCI-e interface, a MIPI interface, etc.). In another example, the communication device 110 may be a wireless data interface (e.g., Wi-Fi, Bluetooth, ZigBee, cellular (3G/4G/5G/LTE), etc.). In another example, the communication devices 110 may implement a radio-frequency (RF) transmitter.

The communication devices 110 may include support for wireless communication by one or more wireless and/or cellular protocols such as Bluetooth®, ZigBee®, IEEE 802.11, IEEE 802.15, IEEE 802.15.1, IEEE 802.15.2, IEEE 802.15.3, IEEE 802.15.4, IEEE 802.15.5, IEEE 802.20, GSM, CDMA, GPRS, UMTS, CDMA2000, 3GPP LTE, 4G/HSPA/WiMAX, SMS, etc. The communication devices 110 may also include support for communication using one or more of the universal serial bus protocols (e.g., USB 1.0, 2.0, 3.0, etc.).

The sensors 114 may be used to determine the status information of the host object (e.g., the vehicle). The sensors 114 may implement a sensor array. The sensor array 114 may be used to determine the position of objects in a proximity range with respect to the apparatus 100. For example, the sensors 114 may implement a radar device, an array of radars, a sonar device, an array of sonars, a LIDAR device, an array of LIDAR devices, an ultra-sound device, an array of ultra-sound devices, etc. The sensors 114 may provide the sensor readings using the signal SEN. In some embodiments, the sensors 114 may be calibrated using the signal SEN. The types of the vehicle sensors 114 used to detect a proximity to other objects may be varied according to the design criteria of a particular implementation.

The actuators 116 may be used to cause an action. The actuators 116 may be implemented as an array of components. The actuators 116 may be configured to convert an electrical signal comprising information and/or instructions (e.g., the signal VCTRL') into a physical action. In an example, the actuators 116 may be configured to turn wheels, increase an acceleration, decrease an acceleration, activate and/or adjust headlights, activate a turn signal, activate air bags, etc. The actuators 116 may control various components of the host vehicle. The number, type and/or functionality of the actuators 116 may be varied according to the design criteria of a particular implementation.

The display 118 may be a screen and/or an output device. In one example, the display 118 may implement an electronic mirror (e.g., an e-mirror). In another example, the display 118 may implement a touchscreen for an infotainment system. In yet another example, the display 118 may implement a back-up camera and/or bird's eye view camera. The display 118 may display a version of video frames captured by one or more of the lenses 112a-112n and/or the capture devices 102a-102n. The video frames captured by the capture device 102a-102n may be cropped, adjusted and/or encoded by the processors 106a-106n to fit the display 118. For example, the processor 106a-106n may provide real-time video streaming to the display 118 via the signal VOUT.

The sensor 140a (e.g., a camera imaging sensor such as a CMOS sensor) of the capture device 102a may receive light from the lens 112a (e.g., the signal IM_A). The camera sensor 140a may perform a photoelectric conversion of the light from the lens 112a. The logic 142a may transform the bitstream into a human-legible content (e.g., video data and/or video frames). For example, the logic 142a may receive pure (e.g., raw) data from the camera sensor 140a and generate video data based on the raw data (e.g., the bitstream). The logic 142a may further control the lens 112a in response to the signal CONTROL_A. The memory buffer 144a may store the raw data and/or the processed bitstream. For example, the frame memory and/or buffer 144a may store (e.g., provide temporary storage and/or cache) one or more of the video frames (e.g., the video signal). In some embodiments, each of the capture devices 102a-102n may comprise other components (e.g., a battery, a motor, a microphone, etc.).

In some embodiments, the sensor 140a may implement an RGB-InfraRed (RGB-IR) sensor. The sensor 140a may comprise a filter array comprising a red filter, a green filter, a blue filter and a near-infrared (NIR) wavelength filter (e.g., similar to a Bayer Color Filter Array with one green filter substituted with the NIR filter). The sensor 140a may operate as a standard color sensor and a NIR sensor. Operating as a standard color sensor and NIR sensor may enable the sensor 140a to operate in various light conditions (e.g., day time and night time).

The CNN module 150 may be configured to implement convolutional neural network capabilities. The CNN module 150 may be configured to implement computer vision using deep learning techniques. The CNN module 150 may be configured to implement pattern and/or image recognition using a training process through multiple layers of feature-detection. Details of the computer vision operations implemented by the CNN module 150 may be described in association with FIG. 5.

The CNN module 150 may be configured to perform feature extraction and/or matching solely in hardware. Feature points typically represent interesting areas in the video frames (e.g., corners, edges, etc.). By tracking the feature points temporally, an estimate of ego-motion of the capturing platform or a motion model of observed objects in the scene may be generated. In order to track the feature points, a matching algorithm is generally incorporated by hardware in the CNN module 150 to find the most probable correspondences between feature points in a reference frame and a target frame. In a process to match pairs of reference and target feature points, each feature point may be represented by a descriptor (e.g., image patch, SIFT, BRIEF, ORB, FREAK, etc.). Implementing the CNN module 150 using dedicated hardware circuitry may enable calculating descriptor matching distances in real time.

The CNN module 150 may be a dedicated hardware module configured to perform feature detection of the video frames. The features detected by the CNN module 150 may be used to calculate descriptors. The CNN module 150 may determine a likelihood that pixels in the video frames belong to a particular object and/or objects in response to the descriptors. For example, using the descriptors, the CNN module 150 may determine a likelihood that pixels correspond to a particular object (e.g., a person, a vehicle, a car seat, a tree, etc.) and/or characteristics of the object (e.g., a mouth of a person, a hand of a person, headlights of a vehicle, a branch of a tree, a seatbelt of a seat, etc.). Implementing the CNN module 150 as a dedicated hardware module of the processors 106a-106n may enable the apparatus 100 to perform the computer vision operations locally (e.g., on-chip) without relying on processing capabilities of a remote device (e.g., communicating data to a cloud computing service).

The computer vision operations performed by the CNN module 150 may be configured to perform the feature detection on the video frames in order to generate the descriptors. The CNN module 150 may perform the object detection to determine regions of the video frame that have a high likelihood of matching the particular object. In one example, the types of object to match against (e.g., reference objects) may be customized using the open operand stack module 160. The CNN module 150 may be configured to perform local masking to the region with the high likelihood of matching the particular object(s) to detect the object.

The sensor fusion module 152 may be configured to analyze information from multiple sensors 114 and/or capture devices 102a-102n for redundancy. By analyzing various data from disparate sources, the sensor fusion module 152 may be capable of making inferences about the data that may not be possible from one of the data sources alone. For example, the sensor fusion module 152 may analyze video data as well as radar, LIDAR, inertial, motion, V2X, location data (e.g., GPS, GNSS, ADAS, etc.), gaze direction, driver state, battery status and/or other sources to develop a model of a scenario to support decision making. The sensor fusion module 152 may also provide time correlation, spatial correlation and/or reliability among the data being received from the different sensors 114.

In an example, the sensor fusion module 152 may spatially overlay an object captured by a camera with the same object captured by LIDAR for better identification and/or ranging (distance and relative velocity) to that object. In a time correlation example, an object may be seen by two sensors at slightly different times (e.g., side-facing sensors near the front bumper and the rear bumper). The sensor fusion module 152 may time shift the data from a leading sensor to align with the data from the trailing sensor. Information from motion sensors may be integrated into the time correlation to determine which sensor is leading, which sensor is trailing and/or how fast the detected object is moving.

In a reliability example, the sensor fusion module 152 may determine the reliability of objects detected by each sensor. The sensor fusion module 152 may adjust the weighting used to overlay the data to give more weight to reliable data and/or less weight to unreliable data (e.g., one of the capture devices 102a-102n may have low reliability in foggy conditions, but radar may have good reliability in foggy conditions). A confidence that the object is really there and is correctly identified may also be calculated in the sensor fusion module 152. The confidence data may be presented to the driving policy block 154 via an on-chip bus, rather than relying on an inter-chip bus.

The driving policy module 154 may be configured to enable human-like intuition. The driving policy module 154 may allow the vehicle to share the road with human drivers. For example, sensing, mapping, and powerful computer vision may provide a model of the environment and/or reaction time of a vehicle to be better than that of a human driver. Applying machine learning to develop and evolve a driving policy may be utilized to provide a human-like intuition and/or behavior needed to analyze multi-variable situations and/or negotiate with human drivers. In an example, the driving policy module 154 may provide a rule set for ethics when making decisions.

The video pipeline 156 may be configured to encode video frames captured by each of the capture devices 102a-102n. In some embodiments, the video pipeline 156 may be configured to perform video stitching operations to stitch video frames captured by each of the lenses 112a-112n to generate the panoramic field of view (e.g., the panoramic video frames). The video pipeline 156 may be configured to perform de-warping, cropping, enhancements, rolling shutter corrections, stabilizing, downscaling, packetizing, compression, conversion, blending, synchronizing and/or other video operations. The architecture of the video pipeline 156 may enable the video operations to be performed on high resolution video and/or high bitrate video data in real-time and/or near real-time. The video pipeline module 156 may enable computer vision processing on 4K resolution video data, stereo vision processing, object detection, 3D noise reduction, fisheye lens correction (e.g., real time 360-degree dewarping and lens distortion correction), oversampling and/or high dynamic range processing. In one example, the architecture of the video pipeline 156 may enable 4K ultra high resolution with H.264 encoding at double real time speed (e.g., 60 fps), 4K ultra high resolution with H.265/HEVC at 30 fps and/or 4K AVC encoding. The type of video operations and/or the type of video data operated on by the video pipeline 156 may be varied according to the design criteria of a particular implementation.

The video pipeline module 156 may implement a digital signal processing (DSP) module configured to receive information (e.g., pixel data values captured by the sensors 140a-140n) from the input signals FRAMES_A-FRAMES_N. The video pipeline module 156 may be configured to determine the pixel values (e.g., RGB, YUV, luminance, chrominance, etc.). The video pipeline module 156 may be further configured to support or provide a sensor RGB to YUV raw image pipeline to improve image quality, perform bad pixel detection and correction, demosaicing, white balance, color and tone correction, gamma correction, adjustment of hue, saturation, brightness and contrast adjustment, chrominance and luminance noise filtering.

The video pipeline module 156 may encode the raw image data into a plurality of encoded video streams simultaneously (in parallel). The plurality of video streams may have a variety of resolutions (e.g., VGA, WVGA, QVGA, SD, HD, Ultra HD, 4K, 8K, etc.). The video pipeline module 156 may receive encoded and/or unencoded (e.g., raw) audio data from an audio interface. The video pipeline module 156 may also receive encoded audio data from a communication interface (e.g., USB and/or SDIO). The video pipeline module 156 may provide encoded video data to the communication devices 110 (e.g., using a USB host interface) and/or the display 118 (e.g., the signal VOUT).

The video pipeline module 156 may implement scheduling. Scheduling may enable the video pipeline 156 to perform various discrete, asynchronous video operations and/or computer vision operations in parallel. The scheduling may enable data results from one video operation to be available by the time another video data operation needs the data results.

The decision making module 158 may be configured to generate the signal VCTRL. The decision making module 158 may be configured to use the information from the computer vision operations and/or the sensor fusion module 152 to determine which actions may be taken. For example, in an autonomous vehicle implementation, the decision making module 158 may determine which direction to turn. The decision making module 158 may utilize data from the CNN module 150 and/or computer vision data using a histogram oriented gradient (HOG). The sources of data for making decisions used by the decision making module 158 may be varied according to the design criteria of a particular implementation.

The decision making module 158 may be further configured to determine the video data to communicate to the display 118. The signal VOUT may be cropped and/or adjusted in response to decisions by the decision making module 158. For example, the decision module 158 may select one field of view (e.g., a wide angle field of view) instead of another field of view (e.g., a narrow angle field of view) to send to the display 118 as the signal VOUT. In another example, the decision making module 158 may adjust output characteristics of the display 118 (e.g., brightness).

The operand stack module 160 generally contains basic tasks used in all autonomous vehicles (e.g., object detection, correlation, reliability, etc.). The openness of the operand stack module 160 may enable car manufacturers to add new and/or proprietary features that could distinguish particular vehicles in the marketplace. The open operand stack module 160 may enable programmability.

The look up table 170 may comprise reference information. In one example, the look up table 170 may allow the captured video data to be compared to and/or cross-referenced with some known set of data. In another example, the look up table 170 may allow the sensor fusion module 152 to compare and/or cross-reference data from the sensors 114 with some known sensor values (e.g., temperature, humidity, etc.). Generally, the look up table 170 may be implemented to index pre-calculated values to save computation time.

The data storage 172 may comprise various data types stored by the memory 108. In an example, the data storage 172 may correspond to detected objects, reference objects, a video file, status information (e.g., readings from the sensors 114) and/or metadata information. The types of data and/or the arrangement of data stored in the memory 108 may be varied according to the design criteria of a particular implementation.

In some embodiments, the video data generated by the processors 106a-106n may be a panoramic video. The video data may be communicated over a network via the communication devices 110. For example, the network may be a bandwidth-constrained network (e.g., a wireless network). The processors 106a-106n may combine hardware de-warping, intelligent video analytics and/or digital zooming. The processors 106a-106n may reduce wireless bandwidth consumption when communicating video data. The processors 106a-106n may increase image resolution within the available bandwidth.

In some embodiments, portions of the panoramic video may be cropped to the size of the display 118 by the processors 106a-106n (e.g., portions of the panoramic video outside of the cropped portion may be discarded and/or not displayed). In some embodiments, the panoramic video may be panned in one or more directions to see additional portions of the panoramic video outside of the field of view of the display 118. For example, the panoramic video may comprise a spherical video, a hemispherical video, a 360 degree video, a wide angle video, a video having less than a 360 field of view, etc. In some embodiments, the panoramic video may provide coverage for a full 360 degree field of view. In some embodiments, less than a 360 degree view may be captured by the panoramic video (e.g., a 270 degree field of view, a 180 degree field of view, etc.). In some embodiments, each of the lenses 112a-112n may be used to capture video frames that provide a portion of a field of view that may be stitched together to provide a field of view that is wider than the field of view captured by each individual one of the lenses 112a-112n. The processors 106a-106n may be configured to perform video stitching operations to stitch together video frames (e.g., arrange video frames according to position and/or time, reduce parallax effects, reduce distortions, etc.).

In some embodiments, the capture devices 102a-102n may implement a rolling shutter sensor. Using a rolling shutter sensor, a small amount of time difference may be present between some portions of each video frame. The processors 106a-106n may be configured to de-warp and/or correct a rolling shutter effect for each video frame.

In some embodiments, the apparatus 100 may further comprise an audio capture device (e.g., a microphone). The audio capture device may capture audio of the environment. The processors 106a-106n may be configured to synchronize the audio captured with the images captured by the capture devices 102a-102n.

The processors 106a-106n may generate output video data and/or video data that may be used internally within the processors 106a-106n. The signal VOUT may be an encoded, cropped, stitched and/or enhanced version of one or more of the signals FRAMES_A-FRAMES_N. The signal VOUT may be a high resolution, digital, encoded, de-warped, stabilized, cropped, blended, stitched and/or rolling shutter effect corrected version of the signals FRAMES_A-FRAMES_N.

The processors 106a-106n may be configured to implement intelligent vision processors. The intelligent vision processors 106a-106n may implement multi-object classification. In one example, multi-object classification may comprise detecting multiple objects in the same video frames using parallel processing that reduces power consumption and/or computational resources compared to detecting multiple objects one object at a time. The multi-object classification may further comprise determining multiple inferences at a time (e.g., compared to first detecting whether an object exists, then detecting that the object is a driver, then determining whether the driving is holding the steering wheel, etc.).

Figure 2:
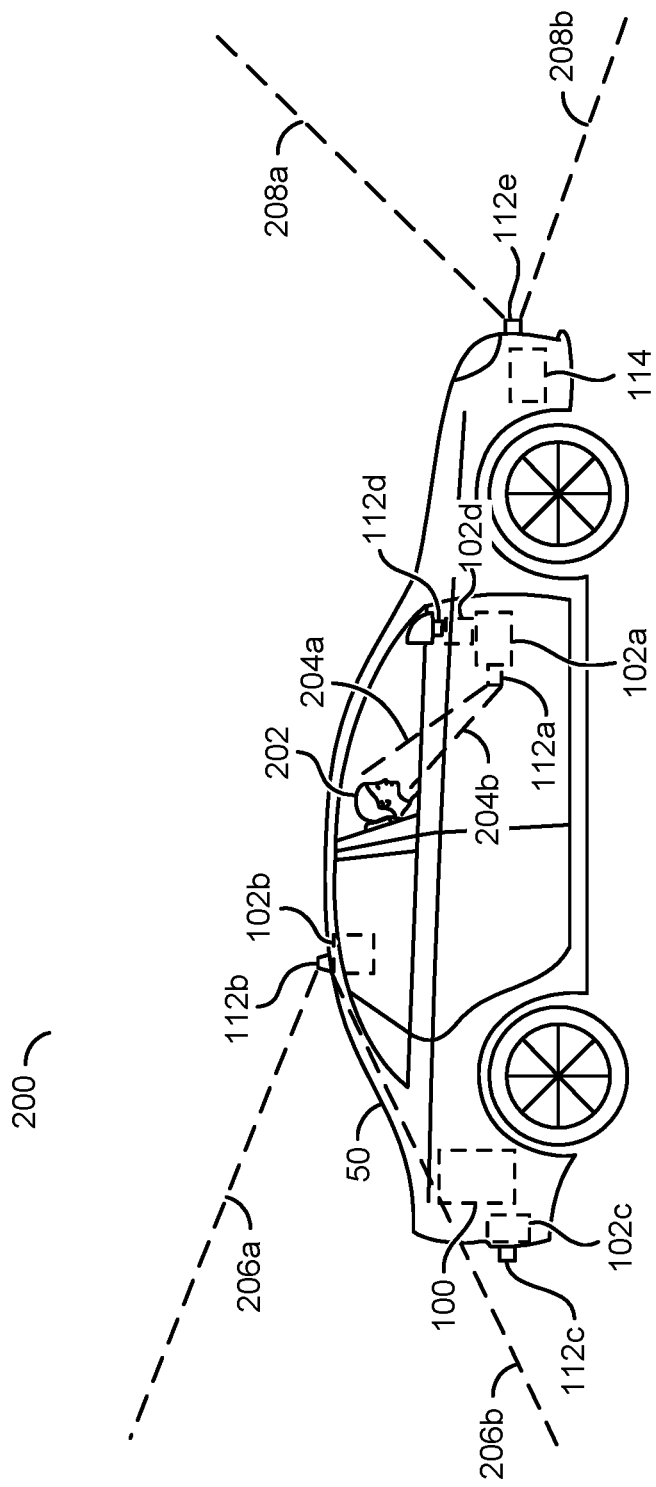
FIG. 2 is a diagram illustrating an example of camera systems inside and outside of a vehicle.

Referring to FIG. 2, a diagram illustrating an example embodiment 200 of camera systems inside and outside of a vehicle is shown. An automobile/vehicle 50 is shown. The apparatus 100 is shown as a component of the vehicle 50. In the example shown, the vehicle 50 is a car. In some embodiments, the vehicle 50 may be a truck, an ATV, an airplane, a drone, etc. The type of the vehicle 50 implementing the apparatus 100 may be varied according to the design criteria of a particular implementation.

A driver 202 is shown seated in the vehicle 50. The vehicle sensors 114 are shown on (or in) the vehicle 50. The apparatus 100 is shown in the rear of the vehicle 50. In another example, the apparatus 100 may be distributed throughout the vehicle 50 (e.g., connections may be implemented between the apparatus 100 and the capture devices 102a-102d and/or sensors 114 such as a direct wired connection and/or a connection using a common bus line). A location of the apparatus 100 may be varied according to the design criteria of a particular implementation.

A camera (e.g., the lens 112a and the capture device 102a) is shown capturing an interior of the vehicle 50 (e.g., detecting the driver 202). A targeted view of the driver 202 (e.g., represented by a line 204a and a line 204b) is shown being captured by the capture device 102a. The capture device 102a may also detect other objects in the vehicle 50 (e.g., a seat, a head rest, an arm rest, a rear window, a seatbelt, a center console, other occupants, etc.). By analyzing video of the driver 202 and/or other occupants of the vehicle 50 (e.g., extracting video data from the captured video), the processors 106a-106n may determine a body position and/or body characteristics (e.g., a distance, orientation and/or location of the body and/or head) of one or more occupants of the vehicle 50 and/or objects within the vehicle 50.

In some embodiments, more than one of the capture devices 102a-102n may be used to capture video data of the driver 202 and/or other occupants of the vehicle 50. A combination of inputs from the signals FRAMES_A-FRAMES_N may be used to detect changes in head/face movements and/or body positions. For example, using multiple cameras (e.g., stereo cameras) may improve the accuracy of depth information. The number of cameras used and/or the type of data extracted from the video data from the driver monitoring cameras may be varied according to the design criteria of a particular implementation.

A camera (e.g., a combination of the lens 112b and the capture device 102b) is shown capturing a targeted view from the vehicle 50. In the example shown, the targeted view from the vehicle 50 (e.g., represented by a line 206a and a line 206b) is shown capturing an exterior view to the rear of (e.g., an area behind) the vehicle 50. Similarly, other cameras may be used to capture video data of a targeted view from the vehicle (e.g., shown as the lens 112c and the camera sensor 102c, the lens 112d and the camera sensor 102d, etc.). For example, the targeted view (e.g., represented by a line 208a and a line 208b) may provide a front exterior view of an area. The number of cameras implemented, a direction captured, an orientation of the cameras and/or an arrangement of the cameras may be varied according to the design criteria of a particular implementation.

The capture devices 102a-102n may be configured to capture video data of the environment around (e.g., area near) the vehicle 50. The processors 106a-106n may implement computer vision to detect objects and/or understand what is happening near the vehicle 50 (e.g., see the environment as a human driver would see the environment). The sensors 114 may be implemented using proximity detection technology. For example, the vehicle sensors 114 may implement a radar device, an array of radars, a sonar device, an array of sonars, a LIDAR device, an array of LIDAR devices, an ultra-sound device, an array of ultra-sound devices, etc.

The sensor fusion module 152 may aggregate data from the sensors 114, the CNN module 150 and/or the video pipeline 156 to build a model and/or abstraction of the environment around the vehicle 50. The computer vision operations may enable the processors 106a-106n to understand the environment, a state of objects, relative positions of objects and/or a meaning of objects to derive inferences (e.g., detect that the state of a streetlight is red, detect that a street sign indicates the vehicle 50 should stop, understand that a pedestrian is walking across the street from right to left, understand that brake lights of a vehicle ahead indicate that the vehicle is slowing down, etc.). The sensor fusion module 152 may enable a comparison and/or cross-reference of the data received from the vehicle sensors 114 at a particular time to the video data captured at another particular time in order to adjust a confidence level of an inference. The type of inferences made by the processors 106a-106n may be varied according to the design criteria of a particular implementation.

Figure 3:
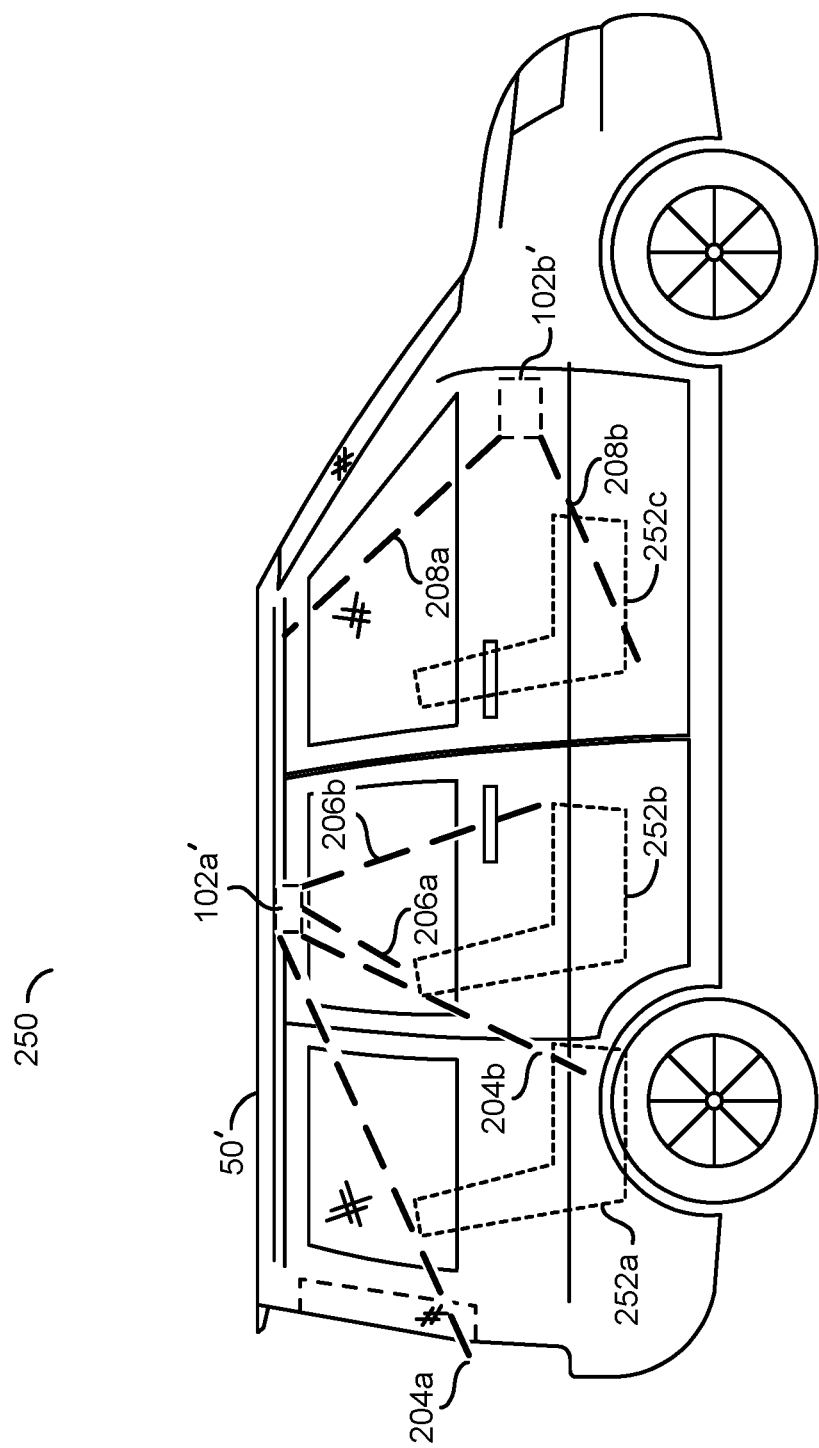
FIG. 3 is a diagram illustrating an example of interior camera systems configured to monitor vehicle occupants.

Referring to FIG. 3, a diagram illustrating an example 250 of interior camera systems configured to monitor vehicle occupants is shown. Various camera angles of an interior of the ego vehicle 50' are shown. Multiple rows of seats 252a-252c are shown in the ego vehicle 50'. Each of the rows of seats 252a-252c may be monitored to detect and/or classify one or more occupants of the ego vehicle 50'. The apparatus 100 may be configured to adjust a position of one or more seats in the rows of seats 252a-252c.

The capture device 102a' is shown mounted on a ceiling of the vehicle 50'. The capture device 102a' is shown having an angle 204a and an angle 204b (e.g., a field of view) that points toward the back row of seats 252a. The capture device 102a' may also have a field of view angle 206a-206b to capture the middle row of seats 252b. In another example, the capture device 102a' may implement a wide angle lens to capture both rows of seats. The field of view from the angle 204a and the angle 204b may provide a targeted view of the interior of the vehicle 50'. Similarly, the capture device 102b' may capture an interior of the vehicle 50'. An angle 208a and an angle 208b may represent a field of view capturing the front row of seats 252c. The multiple fields of view captured by the capture devices 102a'-102n' may be a targeted wide angle view of the interior of the vehicle 50'. The number of angles and/or fields of view may be varied according to the design criteria of a particular implementation.

The processors 106a-106n may be configured to analyze the captured video signal. The processors 106a-106n may detect objects in the captured video signal of the exterior of a vehicle (e.g., automobiles, bicycles, pedestrians, animals, parking spaces, etc.) and/or of an interior of a vehicle (e.g., the driver 202, other occupants, physical characteristics of people in the vehicle, facial expressions of people in the vehicle, fields of view of the people in the vehicle, etc.). The processors 106a-106n may be configured to determine a presence, an absolute location and/or a relative location of the detected objects. Based on the detected objects, the processors 106a-106n may determine a position (e.g., a distance) of the objects relative to the vehicle and/or a position of the objects relative to a component of the vehicle (e.g., distance from a vehicle pillar, distance from a steering wheel, distance from a dashboard, distance from another seat, etc.).

The decision making module 158 may make a decision based on data received at various inputs and/or various data inferred by the processors 106a-106n. For example, the data received may comprise external signals generated in response to user input, external signals generated by the sensors 114 and/or internally generated signals such as signals generated by the processors 106a-106n in response to analysis of the video data and/or objects detected in video data.

The processors 106a-106n may process video data that may not be seen by a person (e.g., not output to the display 118). For example, the video data may be internal to the processors 106a-106n. Generally, the processors 106a-106n perform the computer vision operations in order to interpret the environment to emulate how a person would see the environment and/or provide greater sensory capability than a human. For example, the processors 106a-106n may interpret the environment in many directions at once (e.g., a 360 degree field of view) while a person has a limited field of view.

In some embodiment, the processors 106a-106n may be configured to generate motion vectors to track the movement of objects across video frames temporally. The motion vectors may indicate a direction and/or speed of movement of an object between a current video frame and previous video frames. Tracking movements of objects may enable determining gestures (e.g., to receive input commands) and/or determine a vulnerability of an occupant (e.g., a non-moving occupant may be asleep and/or unconscious). In another example, tracking a static object across video frames temporally may be implemented to determine a status of an object. For example, the windshield may be tracked over time to determine that visibility has been reduced and/or increased (e.g., due to frost forming and/or disappearing).

In some embodiments, the processors 106a-106n may implement depth-sensing techniques. The depth-sensing techniques may compare knowledge of the dimensions of the vehicle 50' to the location and/or body position of the occupants. The processors 106a-106n may cross-reference a body position of the occupants with a location of the components of the vehicle (e.g., how far away the driver is from the steering wheel).

In some embodiments, the video analytics may process the captured video frames for biometric markers to determine a vulnerability of the occupants of the vehicle 50'. For example, one or more of age, height and/or weight may be the determined biometric markers. The biometric markers may be used to differentiate between a child, an adolescent, a pregnant woman, a young adult, teenager, adult, etc. Feature maps may be detected and/or extracted while the video data is processed in the pipeline module 156 to generate inferences about body characteristics to determine age, gender, and/or condition (e.g., wrinkles, facial structure, bloodshot eyes, eyelids, signs of exhaustion, etc.).

The processors 106a-106n may be configured to detect faces in a region of a video frame. In some embodiments, facial recognition may be implemented (e.g., based on faces stored as references in the memory 108 and/or an external database accessible by the communication devices 110). In some embodiments, the processors 106a-106n may be configured to detect objects and classify the objects as a particular type of object (e.g., an elderly person, a child, an animal, etc.).

The processors 106a-106n may implement a "diagnosis" and/or a confidence level for recognizing and/or classifying the objects. In some embodiments, the sensor fusion module 152 may be used to combine information from the sensors 114 to adjust the confidence level (e.g., using a weight sensor in the seat to confirm that the weight of the object is consistent with a person, using temperature sensor readings to confirm that body heat is detected, using seat position preferences to confirm a known occupant, comparing a determined object location exterior to the vehicle with V2X information, etc.).

The processors 106a-106n may determine a type of the detected objects based on a classification. The classification may be based on information extracted from the video data and/or information from the sensors 114 (e.g., environmental factors). For example, the color histogram, the high frequency component and/or video analytics of the video data may be compared to some known reference. In another example, temperature and/or humidity information may be provided by the sensors 114 (e.g., to distinguish a cold person from a hot person). The processors 106a-106n may rule out and/or increase a likelihood of certain types of objects. For example, the classification may comprise a confidence level for a particular hypothesis (or diagnosis) about the condition (e.g., capability) of the detected objects. When the confidence level is above a pre-determined threshold value, the classification may be considered to be confirmed by the processors 106a-106n.

A high confidence level for a particular type of object may indicate that evidence is consistent with the particular type of object. A low confidence level for a particular type of object may indicate that evidence is inconsistent with the particular type of object and/or not enough evidence is available yet. Various checks may be performed to determine the confidence level. The implementation of the classification and/or confidence level to determine the type of object may be varied based on the design criteria of a particular implementation.

The computer vision operations may be one type of video analysis performed by the processors 106a-106n. The processors 106a-106n may be configured to determine a current size, shape and/or color of the objects (e.g., to perform a classification). One or more of the objects may be detected in each video frame. The processors 106a-106n may determine a number of pixels (e.g., a width, a height and/or a depth) comprising the detected objects in each video frame portion of a video frame and/or region of a video frame. Based on the number of pixels of each of the detected objects in the video frame, the processors 106a-106n may estimate a classification of the detected objects and/or adjust the confidence level.

The memory 108 may store the pre-determined locations and/or a pre-determined field of view of each of the capture devices 102a-102n. The memory 108 may store reference data corresponding to the objects. For example, the memory 108 may store reference color histograms about various known types of objects. In another example, the memory 108 may store previously captured frames (e.g., a reference image from when the vehicle 50' was parked, when the vehicle 50' came out of production, a reference image from when a car was in operation, turned off, left unattended, etc.). The type of reference information stored by the memory 108 may be varied according to the design criteria of a particular implementation.

The CNN module 150 may be configured to "train" the processors 106a-106n to know (e.g., store in the memory 108) the objects and/or expected locations (or areas) that the objects may detect in a video frame. The video analytics performed by the processors 106a-106n may determine whether the detected objects are exterior to or interior to the vehicle 50'. The processors 106a-106n may be configured to respond differently to different types of objects. For example, if the classified object is a person, the processors 106a-106n may be further configured to estimate the age of the person via video analytics. For example, the video analytics may be configured to tell the difference between a small child (or incapacitated person), an elderly person and/or an able-bodied adult.

The video analytics may be configured to determine reference objects. For example, the CNN module 150 may be trained to recognize when a car seat is empty. In another example, the CNN module 150 may be configured to recognize when a child, person, pet and/or a type of inanimate object is present in the seat. Comparing the seat in the current video frame to a reference empty seat may enable the processors 106a-106n to detect the presence of occupants even if there is no motion by the occupants.

The processors 106a-106n may determine the width of the reference objects (e.g., based on the number of pixels occupied in the video frame). The memory 108 may store (e.g., in the look up table 170) the width of the reference objects. The processors 106a-106n may determine the width of the reference objects (e.g., the number of pixels in the video frame). The width of the current size of the reference object may be compared to the stored width of the reference object to estimate a distance of the occupants of the vehicle 50 from the lens 112a-112n. For example, a number of pixels may be measured between the reference object and the head of the driver 202 to determine location coordinates of the head of the driver 202.

In some embodiments, the processors 106a-106n may determine the position (e.g., 3D coordinates and/or location coordinates) of various features (e.g., body characteristics) of the occupants of the vehicle 50. In one example, the location of the arms, legs, chest and/or eyes may be determined using 3D coordinates. One location coordinate on a first axis for a vertical location of the body part in 3D space and another coordinate on a second axis for a horizontal location of the body part in 3D space may be stored. In some embodiments, the distance from the lenses 112a-112n may represent one coordinate (e.g., a location coordinate on a third axis) for a depth location of the body part in 3D space. Using the location of various body parts in 3D space, the processors 106a-106n may determine body position, body characteristics and/or the vulnerability of the occupants.

In some embodiments, the processors 106a-106n may be configured to approximate the gaze of the driver 202. For example, the drowsiness and/or attentiveness of the driver 202 may be detected (e.g., recognizing that eyes are closing, recognizing that the head is drifting down, etc.). In another example, the processors 106a-106n may present the recording of the driver 202 to the display 118 (e.g., as a live stream for use in teleconferencing). The processors 106a-106n may be configured to recognize the driver 202 through facial recognition.

The memory 108 (e.g., the look up table 170) may store a reference size (e.g., the number of pixels of a particular reference object in a video frame at a known distance) of particular objects. In another example, the memory 108 may store a reference shape (e.g., an arrangement of pixels of the reference object in the video frame at a known distance). In yet another example, the memory 108 may store a reference color (e.g., a RGB value and/or a YCbCr value for each of the pixels of the reference object in the video frames). The processor 106a-106n may compare the shape, size and/or colors of the reference object to detected objects in the current video frame. The comparison of the size, shape and/or color of the detected objects in the current video frame and the reference size may be used to determine the location coordinates, rotation, orientation and/or movement direction of the objects.

In some embodiments, the lenses 112a-112n and/or the capture devices 102a-102n may be configured to implement stereo vision. For example, the lenses 112a-112n and/or the capture devices 102a-102n may be arranged to capture multiple perspectives of a location. Using the multiple perspectives, the processors 106a-106n may generate a depth map. The depth map generated by the processors 106a-106n may be used to estimate depth, provide 3D sensing and/or provide an immersive field of view with a 3D effect (e.g., a spherical field of view, an immersive field of view, a 360 degree field of view, less than a 360 degree field of view, etc.).

Referring to FIG. 4, a diagram illustrating an object comparison between a reference video frame and a captured video frame is shown. The reference video frame 300 and the current video frame 300' may be video frames processed by the processors 106a-106n (e.g., generated in response to the signals FRAMES_A-FRAMES_N by one of the capture devices 102a-102n). The reference video frame 300 and the current video frame 300' may be a targeted view directed towards the interior of the vehicle 50. In an example, the lens 112a mounted on the dashboard of the vehicle 50 may capture the reference video frame 300 and the current video frame 300'. The view captured for each of the video frames may be varied according to the design criteria of a particular implementation.

The reference video frame 300 may be a video frame captured at an earlier time than the current video frame 300'. For example, the reference video frame 300 may be stored in the memory 108 (e.g., in the data storage portion 172). In some embodiments, the reference video frame 300 may be pre-loaded in the apparatus 100. For example, the reference video frame 300 may be captured by implementing fleet learning (e.g., to be described in more detail in association with FIG. 5). In some embodiments, the reference video frame 300 may be captured when the vehicle 50 is idle and/or turned off. In some embodiments, the reference video frame 300 may be captured periodically. The method of capturing the reference video frame (or frames) 300 may be varied according to the design criteria of a particular implementation.

The reference video frame 300 shown may be a representative example of one or more reference video frames implemented by the apparatus 100. In an example, reference video frames 300 may be captured for many different scenarios and/or locations within or outside of the vehicle 50. For example, the reference video frames 300 may be captured for a driver seat, a passenger seat, for each seat of the rows 252a-252c, the interior of the vehicle 50, the exterior of the vehicle 50, etc. Generally, the reference video frame 300 is used by the processors 106a-106n to classify, analyze and/or store reference objects. The reference objects may be used by the processors 106a-106n to compare with objects captured in the current video frame 300'. The reference objects may be used to provide objects having known characteristics such as sizes, shapes, colors, feature maps, edges, color histograms, contrasts, orientations, etc. The characteristics of the reference objects may be used as a comparison point for detecting, recognizing and/or classifying objects in the computer vision operations. The types of reference objects and/or characteristics of the reference objects may be varied according to the design criteria of a particular implementation.

In the example reference video frame 300, a reference object 302 is shown. In the example shown, the reference object 302 may be a head rest of the driver side seat. The CNN module 150 may determine the width (e.g., D_REF) of the reference object 302 (e.g., based on the number of pixels occupied in the reference video frame 300). In some embodiments, the look up table 170 may store the width D_REF. The width D_REF may be determined when the reference object 302 is at a known distance from the lens 112a.

In the example reference video frame 300, a reference object 304 is shown. In the example shown, the reference object 304 may be a driver seat belt. The CNN module 150 may determine a location of the seat belt 304 (e.g., a location based on a horizontal and/or vertical pixel count). In some embodiments, sensors 114 may provide an indication of the status of the seat belt 304 (e.g., clicked into place, unused, etc.). The sensor fusion module 152 may use the computer vision data from the CNN module 150 and/or the readings of the sensors 114 to determine a confidence level of the status of the seat belt 304. In the example shown, the reference video frame 300 may provide a reference for when the status of the seat belt 304 is unused (e.g., not being worn by a passenger/driver).

In the example reference video frame 300, a reference object 310 is shown. In the example shown, the reference object 310 may be an unoccupied seat. For example, the CNN module 150 may recognize color, shape, distance, stitching, design, etc. of the reference object 310.

The current video frame 300' may be one or more video frames analyzed by the processors 106a-106n (e.g., a video frame within the video pipeline 156). The current video frame 300' may be analyzed by the processors 106a-106n in real-time (e.g., within approximately 500 ms). The CNN module 106a-106n may perform a computer vision analysis on the current video frame 300' and/or compare features and/or characteristics of the current video frame 300' to one or more reference video frames.

The current video frame 300' shows the vehicle 50, the driver 202, the detected object 302', the detected object 304' and/or the detected object 310'. In the current video frame 300', the head rest 302' may be closer to the lens 112a than in the reference video frame 300. In the current video frame 300', the status of the seat belt 304' may be determined to be worn by the driver 202 (e.g., detected across the chest of the driver 202). In the current video frame 300', the detected object 310' may be the driver 202 sitting in the driver seat (e.g., an object covering the details of the empty seat 310 in the reference video frame 300). The processors 106a-106n may detect and/or determine characteristics of various sub-objects of the detected object 310'. In an example, the processors 106a-106n may identify sub-objects such as the eyes of the driver 202, locations of the arms and hands (e.g., holding the steering wheel), location of the hands on the steering wheel (e.g., at the ten and two position of the steering wheel) an angle of the head, a rotation of the head, field of view of the driver (e.g., direction of the eyes), body rotation, body lean, body orientation, a color of clothing, etc.

In some embodiments, one or more of the reference objects (e.g., the head rest 302) may be physically connected to the vehicle 50. In an example, the reference objects may be an arm rest, a steering wheel, the rear seat row 252n, a dashboard, a sunroof and/or a moon roof. The reference object 302 may be a vehicle component that is capable of relative movement with respect to the lens 112a. In some embodiments, the reference object (e.g., the head rest 302) may be used to determine a distance of the driver 202 from the lens 112a (e.g., objects that correlate to where the driver 202 is seated).

For example, if the headrest 302' is determined to be 4.5 feet away (e.g., by comparing the current size D_CURRENT to the reference size D_REF to infer a distance) from the lens 112a then an average sitting posture and head size may be used to estimate that the eyes of the driver 202 may be 3.5 feet from the lens 112a. In another example, the capture device 102a may implement depth-sensing technology to determine how far away the driver 202 is from the lens 112a. In yet another example, stereo video processing may be implemented by the processors 106a-106n to generate a depth map to determine how far away the driver 202 is from the lens 112a. Using the depth information and/or a horizontal and vertical position of the detected object 310', the processors 106a-106n may determine the position (e.g., 3D coordinates and/or location coordinates) of the driver 202 and/or particular body parts of the driver 202.

In some embodiments, the processors 106a-106n may compare the current video frame 300' to the reference video frame 300. In some embodiments, the current video frame 300' may not be directly compared to the reference video frame 300. For example, the CNN module 150 may implement deep learning to gather information and/or statistics about various features of objects. The CNN module 150 may determine features of objects corresponding to the current video frame 300'. The processors 106a-106n may compare the features extracted from the current video frame 300' to features extracted from numerous reference video frames. For example, the reference video frame 300 and/or the current video frame 300' may be used as training data for the CNN module 150. The types of features extracted from video frames to perform the computer vision analysis may be varied according to the design criteria of a particular implementation.

Figure 5:
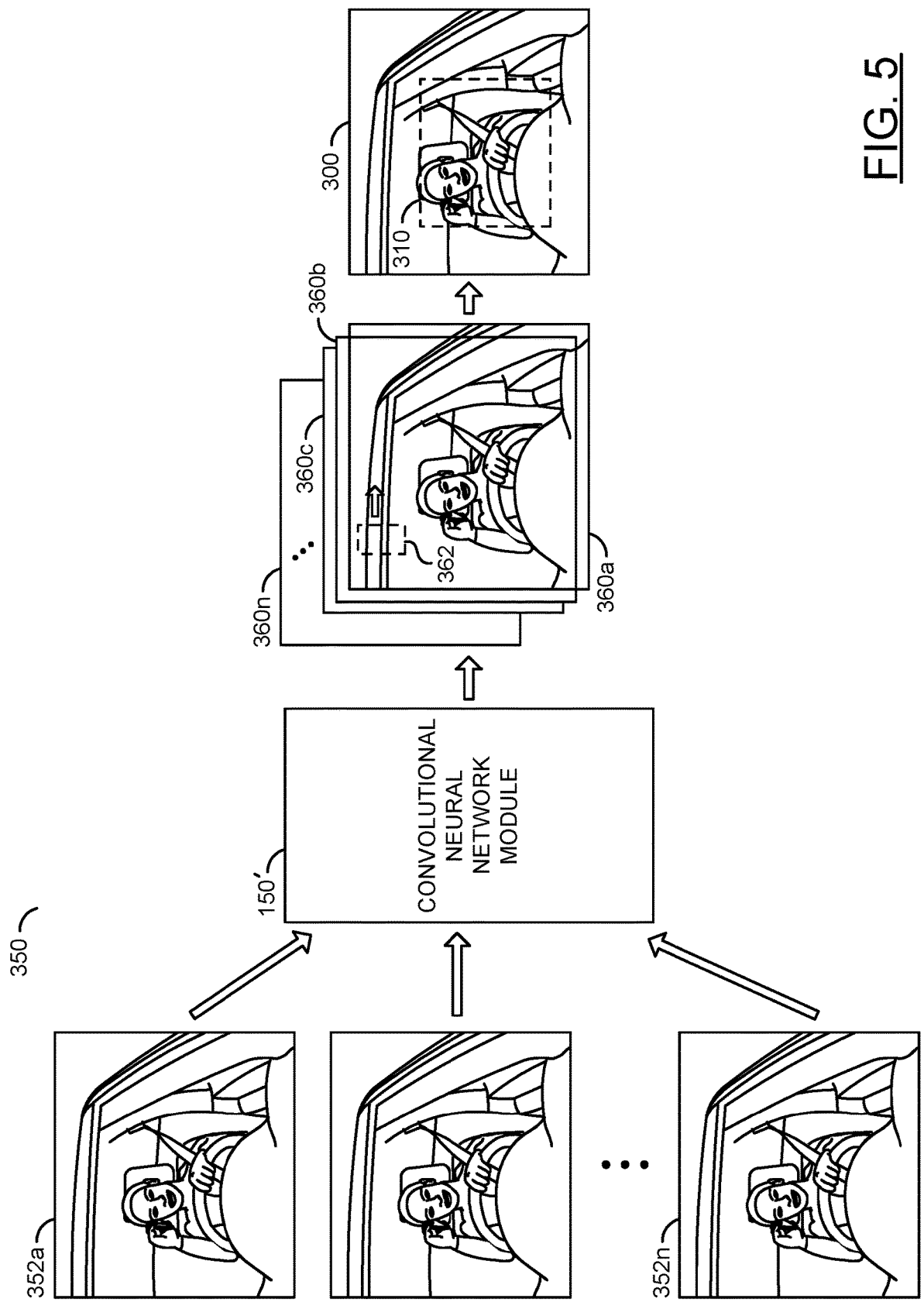
FIG. 5 is a diagram illustrating an example visualization of training a convolutional neural network for object detection using fleet learning.

Referring to FIG. 5, a diagram illustrating an example visualization 350 of training a convolutional neural network for object detection using fleet learning is shown. To detect objects using computer vision, the convolutional neural network 150' may be trained using training data 352a-352n. The training data 352a-352n may comprise a large amount of information (e.g., input video frames). The information for the training data 352a-352n may be received using the video data (e.g., the signals FRAMES_A-FRAMES_N) processed by the video pipeline module 156.

While the apparatus 100 is in operation, the CNN module 150 may continually learn using new video frames as the input training data 352a-352n. However, the processors 106a-106n may be pre-trained (e.g., configured to perform computer vision before being installed in the vehicle 50). For example, the results of training data 352a-352n may be pre-programmed and/or loaded into the processors 106a-106n. In some embodiments, the signal CV generated by the processors 106a-106n may be sent to the interface 104 to enable the communication devices 110 to upload computer vision information (e.g., to a centralized service and/or peer-to-peer communication). Similarly, the communication devices 110 may receive computer vision data and the interface 104 may generate the signal CV in order to update the CNN module 150.

In some embodiments, fleet learning may be implemented to gather large amounts of the training data 352a-352n. For example, cameras may be installed in production facilities (e.g., at the end of the production line) to capture many reference images of different types of vehicles to be used as the training data 352a-352n. In the example shown, the training data 352a-352n may capture an occupied interior of a vehicle (e.g., of a driver holding a smartphone). For example, the training data 352a-352n may be a sequence of video frames of a person talking on a cellular phone while driving. Using the training data 352a-352n (e.g., video frames captured from many different vehicles as the vehicles are produced), many training data sets may be available to train the CNN module 150'. In an example, different makes and models may be analyzed. In another example, different interior colors may be analyzed. In yet another example, different drivers (e.g., different people) talking while holding various models of smartphones may be analyzed. In some embodiments, the training data 352a-352n may be uploaded to a central CNN module 150' to perform and/or train the computer vision. The results of the training from the central CNN module 150' may be installed on each of the CNN modules 150 of each apparatus 100 (or transmitted while the apparatus 100 is in operation to remotely provide updates via the communication devices 110).

The CNN module 150' may receive the training data 352a-352n. To perform the training and/or the computer vision operations, the CNN module 150' may generate a number of layers 360a-360n. On each one of the layers 360a-360n, the CNN module 150' may apply a feature detection window 362. In an example, the feature detection window 362 is shown on a portion of the layer 360a. A convolution operation may be applied by the CNN module 150' on each of the layers 360a-360n using the feature detection window 362.

The convolution operation may comprise sliding the feature detection window 362 along the layers 360a-360n while performing calculations (e.g., matrix operations). The feature detection window 362 may apply a filter to pixels and/or extract features associated with each layer 360a-360n. The feature detection window 362 may be applied to a pixel and a number of surrounding pixels. In an example, the layers 360a-360n may be represented as a matrix of values representing pixels and/or features of one of the layers 360a-360n and the filter applied by the feature detection window 362 may be represented as a matrix. The convolution operation may apply a matrix multiplication between the region of the current layer covered by the feature detection window 362. The convolution operation may slide the feature detection window 362 along regions of the layers 360a-360n to generate a result representing each region. The size of the region, the type of operations applied by the filters and/or the number of layers 360a-360n may be varied according to the design criteria of a particular implementation.

Using the convolution operations, the CNN module 150' may compute multiple features for pixels of an input image in each extraction step. For example, each of the layers 360a-360n may receive inputs from a set of features located in a small neighborhood (e.g., region) of the previous layer (e.g., a local receptive field). The convolution operations may extract elementary visual features (e.g., such as oriented edges, end-points, corners, etc.), which are then combined by higher layers. Since the feature extraction window 362 operates on a pixel and nearby pixels, the results of the operation may have location invariance. The layers 360a-360n may comprise convolution layers, pooling layers, non-linear layers and/or fully connected layers. In an example, the convolution operations may learn to detect edges from raw pixels (e.g., the first layer 360a), then use the feature from the previous layer (e.g., the detected edges) to detect shapes in a next layer (e.g., 360b) and then use the shapes to detect higher-level features (e.g., facial features) in higher layers and the last layer may be a classifier that uses the higher level features.

Using the input video frames as the training data 352a-352n, the CNN module 150' may be trained. The training may comprise determining weight values for each of the layers 360a-360n. For example, weight values may be determined for each of the layers 360a-360n for feature extraction (e.g., a convolutional layer) and/or for classification (e.g., a fully connected layer). The weight values learned by the CNN module 150' may be varied according to the design criteria of a particular implementation.

The CNN module 150' may execute a data flow directed to feature extraction and matching, including two-stage detection, a warping operator, component operators that manipulate lists of components (e.g., components may be regions of a vector that share a common attribute and may be grouped together with a bounding box), a matrix inversion operator, a dot product operator, a convolution operator, conditional operators (e.g., multiplex and demultiplex), a remapping operator, a minimum-maximum-reduction operator, a pooling operator, a non-minimum, non-maximum suppression operator, a scanning-window based non-maximum suppression operator, a gather operator, a scatter operator, a statistics operator, a classifier operator, an integral image operator, comparison operators, indexing operators, a pattern matching operator, a feature extraction operator, a feature detection operator, a two-stage object detection operator, a score generating operator, a block reduction operator, and an upsample operator. The types of operations performed by the CNN module 150' to extract features from the training data 352a-352n may be varied according to the design criteria of a particular implementation.

The CNN module 150' may consume input images (e.g., the training data 352a-352n) that have multiple color channels (e.g., a luminance channel and two chrominance channels). A color detection process implemented by the video pipeline module 156 may be implemented to output images with color likelihood (or probability) values for a particular color at one or more pixel locations in the input images. For example, shared buffers between the video pipeline module 156 and/or the CNN module 150' may enable information sharing between components of the processors 106a-106n. The color detection process may be used to extract features from the training data 352a-352n.

The color detection and/or feature extraction process is generally operational to determine a color likelihood value that pixels in each pixel location of an input image (e.g., the training data 352a-352n during training and/or input video frames) have a specific color. In various embodiments, the specific color may be the shade of yellow used in streets and highways to identify the center and/or edges of traffic lanes and/or other road marks. In other embodiments, the specific color may be the shade of white used on the streets and highways for similar reasons. Generally, the specific color may be any color commonly applied to roadway markings, traffic lights and/or traffic signs.

The color feature extraction may also detect colors that are commonly associated with pavement repair, such as black asphalt. A result of the color feature extraction may be a set of multiple (e.g., 16) features for each pixel of interest. The input image is typically generated by warping an original image taken by an on-dash mounted camera (e.g., the capture device 102a and/or the lens 112a) through an inverse perspective mapping.

The CNN module 150' may implement a color classification operation. The color classification operation may determine a color likelihood value for one or more pixel locations in the input images. The color likelihood values generally define a probability that a particular pixel location is approximately similar to or matches the specified color (e.g., red, green, yellow or white). The results of the color classification operation may be arrays (or probability maps) of color likelihood values that indicates a confidence in the color at each pixel location. In some embodiments, pixel locations different from the specified color may be segmented out of the map by applying a threshold to each color likelihood value. For example, the color likelihood values below a threshold (e.g., pixels below the top N % classification probability) may be set to a default probability value (e.g., zero).

In some embodiments, the feature extraction window 362 may be considered by the color detection process on one of the layers 360a-360b. The feature extraction window 362 may consider a pixel of interest. In an example, the pixel of interest may be a current pixel location being color classified. The feature extraction window 362 may generally represent a local context and contrast around the pixel of interest.

The pixels of the training data 352a-352n may each be represented as components in multiple color channels. In some designs, the color channels may include a luminance channel (e.g., A) and two chrominance channels (e.g., B and C). In various embodiments, the channels ABC may be representative of YUV, YCbCr, YPbPr, RGB, sRGB or YIQ color models. Other color models may be implemented to meet the design criteria of a particular application.

In various embodiments, the CNN module 150' may implement a common Adaboost classifier technique. Specifically, the Adaboost classifier technique combines multiple (e.g., Z) weak depth-two decision trees in a cascade to form a strong classifier. During training, each node of the weak classifiers may select one of the Z features that best separates training samples of different categories. The determination process may generate the color likelihood values that indicate a confidence in the color at each pixel location. Other classifier techniques may be implemented to meet the design criteria of a particular application.

The CNN module 150' generally provides a feature descriptor technique with multiple (e.g., 16) discriminative features that may be efficiently computed. When combined with the Adaboost classifier process, the feature descriptor may achieve good object (e.g., lane marking detection) and color classification accuracy. The simplicity and efficiency of the color detection technique may be well suited for embedded environments and time-critical applications, such as self-driving car. The color detection method is generally a learning-based solution trained off-line from tens of thousands of images, taken under many different scenarios and lighting conditions, and annotated by human experts for lane markings, and is therefore robust.

Using fleet learning, the CNN module 150' may generate one or more reference video frames 300. The reference video frame 300 may comprise masks and/or categorized instances of the reference objects 310. The reference objects 310 may be objects that have been sufficiently defined to enable reliable recognition using computer vision.

The processors 106a-106n may generate images that provide better image processing that allows "seeing" objects in very challenging environments (e.g., very dark and/or bright sun into the camera). The processors 106a-106n may provide hardware acceleration that allows operating on higher resolution and/or running more sophisticated computer vision techniques. High resolution video and sophisticated computer vision operating in real time are relevant to in-cabin use cases. The computer vision operations performed by the CNN module 150' may determine a size, shape, orientation and/or arrangement of a recognized object.

By analyzing a number of video frames in sequence, the computer vision operations performed by the CNN module 150' may determine a trajectory of a recognized object. The computer vision operations may be configured to analyze and/or understand (e.g., interpret, translate, etc.) the digital video to extract and/or produce numerical and/or symbolic information about the digital video. The numerical and/or symbolic information may enable other components to interpret the visual information analyzed by the CNN module 150'.

Figure 6:
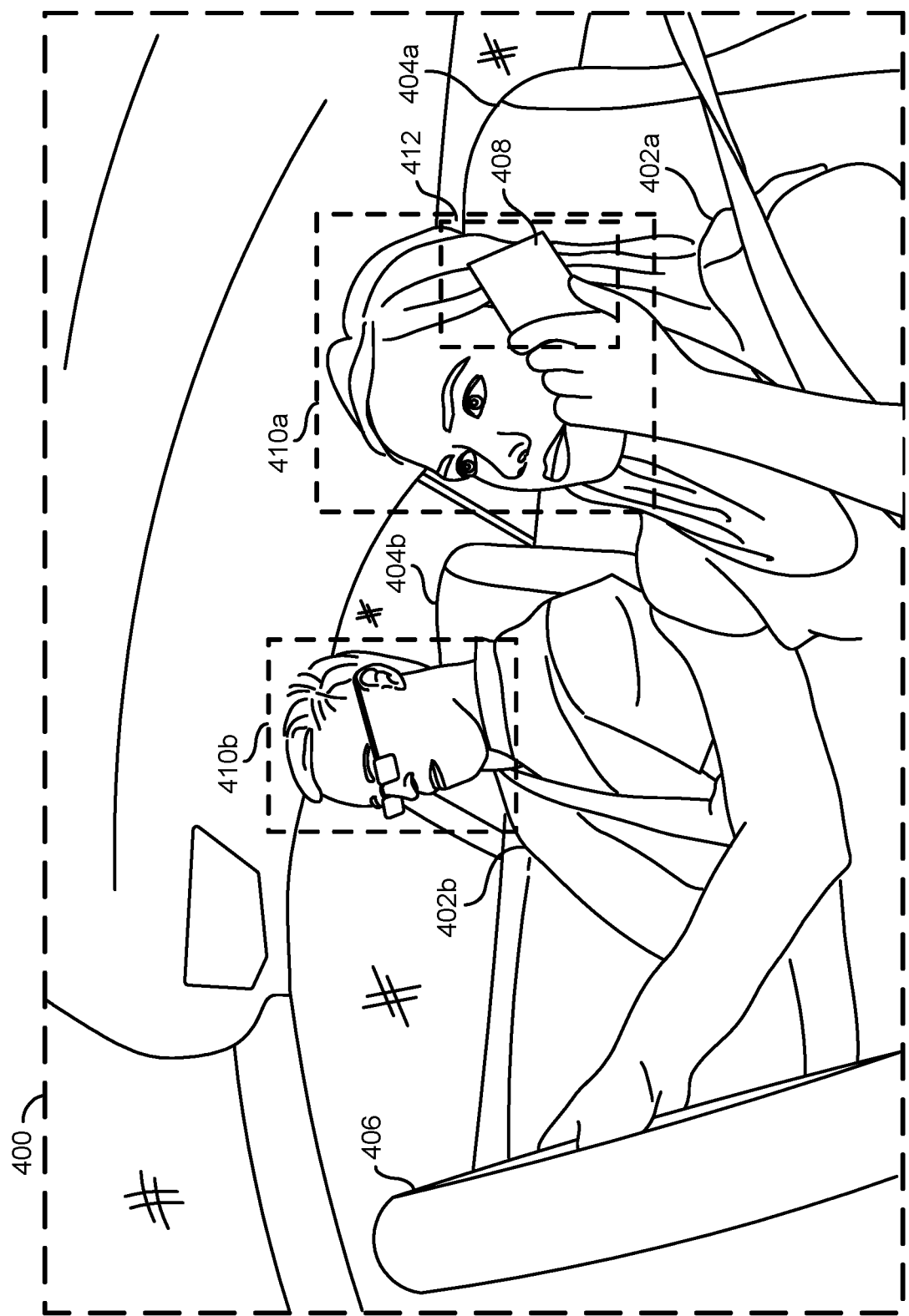
FIG. 6 is a diagram illustrating an example video frame used to detect mobile phone usage.

Referring to FIG. 6, a diagram illustrating an example video frame used to detect mobile phone usage is shown. An example video frame 400 is shown. The example video frame 400 may be a video frame of the interior of the ego vehicle 50 captured by one of the capture devices 102a-102n. The example video frame 400 may be a video frame capturing a front row of seats of the interior of the ego vehicle 50.

Occupants 402a-402b are shown in the video frame 400. The seats 404a-404b are shown in the video frame 400. The occupant 402a may be in the driver seat 404a. The occupant 402b may be in the passenger seat 404b. In an example, the driver 402a may be the driver 202 being captured by the capture device 102a as shown in association with FIG. 2.

A steering wheel 406 is shown. The steering wheel 406 may correspond with the driver seat 404a. In an example, the decision module 158 may determine which of the occupants 402a-402b is the driver based on the location of the steering wheel 406 (e.g., for regions where the driver side of a vehicle is the right side).

An electronic device 408 is shown. In the example shown, the electronic device 408 may be a cellular phone (e.g., a smartphone). The driver 402a is shown holding the smartphone 408. The smartphone 408 is shown held up to the ear of the driver 402a. In the example shown, the use of the smartphone 408 may be an unauthorized use. For example, use of the smartphone 408 while driving may be illegal and/or result in the driver 402a receiving a fine if caught by a traffic enforcement official.

The decision module 158 may be configured to determine whether the use of the electronic device 408 is an unauthorized use. In an example, if the electronic device 408 is a cellular phone, the unauthorized use may be talking on the cellular phone 408 while driving. In another example, if the electronic device 408 is a cellular phone, the unauthorized use may be using the cellular phone 408 to text while driving. In yet another example, if the electronic device 408 is a cellular phone, the unauthorized use may be watching video on the cellular phone 408 while driving. Generally, the unauthorized use of the electronic device 408 may be interactions with the electronic device 408 that distract the driver 402a from driving the ego vehicle 50. The decision module 158 may analyze the results of the computer vision operations performed by the processors 106a-106n to determine whether there is unauthorized use of the electronic device 408.

Boxes 410a-410b may represent the faces and/or heads detected by the processors 106a-106n. The detected face 410a may be the face of the driver 402a. The detected face 410b may be the face of the passenger 402b. The processors 106a-106n may further detect the seats 404a-404b. The processors 106a-106n may be configured to determine that the detected face 410a corresponds to the occupant 402a located in the driver seat 404a. The processors 106a-106n may be configured to determine that the detected face 410b corresponds to the occupant 402b located in the passenger seat 402b. The processors 106a-106n may be further configured to detect other passengers within the ego vehicle 50. In the example shown, only the two occupants 402a-402b are shown. However, the number and/or locations of the occupants of the ego vehicle detected by the processors 106a-106n may be varied according to the design criteria of a particular implementation.

The CNN module 150 may be configured to determine current characteristics of the components of the ego vehicle 50. In one example, the CNN module 150 may determine the current location of the seats 404a-404b and/or the current angle of recline of the seats 404a-404b. The current location and/or current recline of the seats 404a-404b may be an example of current characteristics of the components of the ego vehicle 50. The driver 402a is shown holding the steering wheel 406. The CNN module 150 may be configured to detect and/or classify the object 406 as a steering wheel. The CNN module 150 may be further configured to detect a location and/or angle of the steering wheel 406 (e.g., a current configuration and/or orientation of a component of the ego vehicle 50).

The processors 106a-106n may be configured to determine the characteristics of the occupants 402a-402b for a particular one of the seats 404a-404b. In an example, the characteristics of the occupants 402a-402b may comprise an orientation of body parts. In the example shown, the characteristics of the driver 402a may comprise a location and/or orientation of the right arm (e.g., holding the steering wheel 406) and the left arm (e.g., held up to the ear). In another example, the characteristics of the driver 402a may comprise a direction and/or rotation of the head. In the example shown, the driver 402a is shown looking forward (e.g., at the road). If the driver 402a is not looking at the road, the decision module 158 may determine that the driver 402a is potentially distracted (e.g., the driver 402a may be looking down to text on an electronic device). The types of characteristics analyzed may be varied according to the design criteria of a particular implementation.

A dotted box 412 is shown. The dotted box 412 may correspond to the smartphone 408. The dotted box 412 may represent the computer vision operations performed by the processors 106a-106n detecting the smartphone 408 in the example video frame 400. The processors 106a-106n may be configured to detect a location of the smartphone 408 within the video frame 400. In an example, the processors 106a-106n may determine coordinates (e.g., horizontal, vertical and depth) of the location of the smartphone 408 with respect to the video frame 400. The determined coordinates of the location of the smartphone 408 may be cross-referenced with the determined location of the detected face 510a. In the example shown, the dotted box 412 is shown next to (or near or close to) the ear of the driver 402a. For example, the decision module 158 may determine that the coordinates of the smartphone 408 match and/or fall within a range of coordinates of the video frame 400 that correspond with the location of the detected head 410a of the driver 402a. In the example shown, the smartphone 408 is within the dotted box 410a shown around the head of the driver 402a.

The decision module 158 may be configured to determine whether the driver 402a is using the smartphone while driving. In one example, detecting the smartphone 408 close to the ear and/or head of the driver 402a may be sufficient evidence to determine that the driver 402a is using the smartphone 408 while driving (e.g., an unauthorized and/or illegal use). The decision module 158 may analyze the results of the computer vision operations to determine an amount of time that the hand and/or the smartphone 408 has been located close to the ear. For example, the decision module 158 may determine that the unauthorized use of the smartphone 408 may occur when the hand and/or the smartphone 408 has been located close to the ear for a pre-determined amount of time TS (e.g., 10 seconds, 20 seconds, a minute, etc.). When the decision module 158 determines that there is an unauthorized use of the smartphone 408, the processors 106a-106n may perform a response to notify the driver 402a. The response by the processors 106a-106n may be to generate the signal VCTRL. The signal VCTRL may be a notification signal. The signal VCTRL may be transmitted to one or more of the actuators 116 to perform the response selected by the decision module 158.

The notification signal VCTRL may be generated to enable a response that warns the driver 402a about the unauthorized usage. In one example, the response may be to perform an audible noise to alert the driver 402a. One of the actuators 116 may be a speaker and the signal VCTRL may cause the speaker to generate audio. In an example, the audio may be a warning sound (e.g., similar to a no seatbelt warning). In another example, the audio may be a pre-recorded message (e.g., a voice speaking a message such as, "It is against the law to use a mobile phone while driving. Please put the phone down and pay attention to the road, or you may receive a fine."). In another example, the response may be to activate a warning light and/or display a message on an infotainment system. One of the actuators 116 may be a warning light. For example, the dashboard may provide a warning light (e.g., similar to an engine light) that represents a warning about using a smartphone. One of the actuators 116 may be the infotainment system. For example, the infotainment system may print out a message (e.g., "put the phone down") and/or display an icon (e.g., an image of a phone with an X drawn over the phone). The number and/or type of notifications and/or responses performed may be varied according to the design criteria of a particular implementation.

In some embodiments, the decision module 158 may select graduating (or tiered) responses. In an example, a first tier response may be the warning light. If the processors 106a-106n determine that the driver 402a has not stopped using the smartphone 408 while driving, then a next tier warning response may be performed. In an example, a second tier response may be the audio message. If the processors 106a-106n determine that the driver 402a has not stopped using the smartphone 408 while driving, then a next tier warning response may be performed. In an example, a next tier response may be limiting a speed that the driver 402a may travel and/or pulling the ego vehicle 50 over to the side of the road (e.g., if the ego vehicle 50 is implemented with some autonomous driving capabilities). The number of response tiers and/or types of responses in each tier of responses may be varied according to the design criteria of a particular implementation.

The decision module 158 may be configured to compare a detected scenario to local rules. In one example, the local rules may be stored by the memory 108. The local rules may indicate when and how the use of the electronic device 408 is unauthorized. The local rules may be determined based on a GPS/GNSS reading (e.g., performed by the sensors 114) to determine a current location. For example, a current location may be compared to a region that the local rules are applied to.

A vehicle usage scenario may be detected by the processors 106a-106n receiving information from the sensors 114. The sensor fusion module 152 may determine the vehicle usage scenario by aggregating information about the ego vehicle 50 with the computer vision operations performed by the CNN module 150. In one example, use of the smartphone 408 may be authorized when the ego vehicle 50 is pulled over to the side of the road and parked. The sensors 114 may provide information indicating that the ego vehicle 50 is not moving, that the hazard lights are flashing and that the transmission is set to park. If the sensor fusion module 152 provides information that the ego vehicle 50 is parked, and the local rules allow for the smartphone 408 to be used while the vehicle is parked, then the decision module 158 may not perform the response when the smartphone 408 is detected near the ear of the driver 402a. In another example, if the sensor fusion module 152 indicates that the user is stopped at a stoplight instead of parked on the side of the road, then the decision module 158 may perform the response (e.g., the sensors 114 may detect no speed, but the ego vehicle 50 may not be in park and the brakes may be applied and no hazard lights are on). In another example, if the local rules indicate that there are no laws against usage of the smartphone 408 while driving, then the decision module 158 may not perform the response.

In some embodiments, the processors 106a-106n may detect and/or analyze the passenger 402b. In an example, if the passenger 402b is using the smartphone 408 instead of the driver 404a, then no response may be performed (e.g., mobile phone usage by the passenger 404b may be authorized). The decision module 158 may distinguish between smartphone usage by the driver 404a and the passenger 404b and/or other passengers (e.g., to prevent false positives).

The CNN module 150 may be configured to implement the dedicated hardware module configured to perform the feature detection to calculate the descriptors. In the example shown, the descriptors may be used by the processors 106a-106n for determining a likelihood that the pixels of the video frame 400 belong to the objects (e.g., the detected face 410a and the detected smartphone 412) that correspond to the use of the electronic device 408 by the driver 402a.

Figure 7:
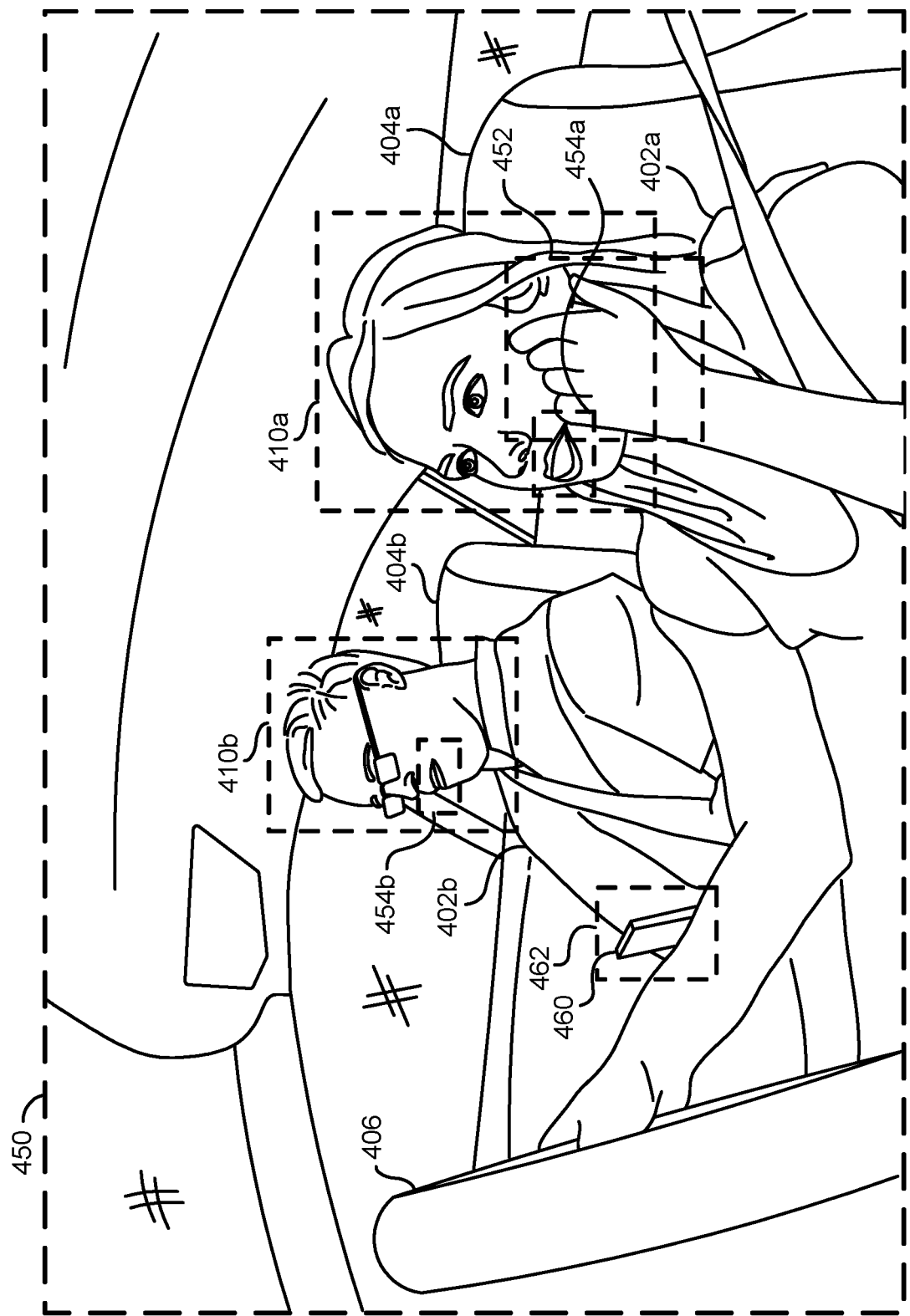
FIG. 7 is a diagram illustrating an example video frame used to detect characteristics of mobile phone usage.

Referring to FIG. 7, a diagram illustrating an example video frame 450 used to detect characteristics of mobile phone usage is shown. Similar to the example video frame 400 shown in association with FIG. 6, the example video frame 450 may comprise the occupants 402a-402b, the seats 404a-404b, the steering wheel 406 and the detection boxes 410a-410b. In the example video frame 450, the smartphone 408 may be hidden from view or not being used by the driver 402a. The processors 106a-106n may be configured to determine whether the driver 402a is attempting to conceal usage of a smartphone. The processors 106a-106n may be configured to determine whether the driver 402a is not using the smartphone 408.

A dotted box 452 is shown. The dotted box 452 may represent a detection of the hand of the driver 402a by the CNN module 150. The CNN module 150 may be configured to determine the orientation and/or characteristics of the detected hand 452 (e.g., location, gripping an object, not gripping an object, open, closed, bent, held upright, etc.). In the example shown, the orientation and/or characteristics of the detected hand 452 may be that the hand is located near the ear of the driver 402a, the hand is gripping an object, the object is not visible, and the hand is upright.

Based on the orientation and/or characteristics of the detected hand 452, the decision module 158 may determine whether the driver 402a is holding the smartphone 408 (e.g., detect the smartphone 408 in the detected hand 452 of the driver 402a). In some scenarios, the decision module 158 may be unable to make a conclusive decision based on the detected hand 452. In the example shown, the detected hand 452 may be holding the smartphone 408 (e.g., which may be an unauthorized usage), may be holding another item (e.g., which may or may not be an unauthorized usage) or the driver 402a may be resting her head on her hand (e.g., not unauthorized). For the example shown, the decision module 158 may be unable to achieve a high enough confidence level to determine whether the driver 402a is using the smartphone 408. The sensor fusion module 152 may be configured to aggregate other sources of data to enable the decision module 158 to make a decision.

Dotted boxes 454a-454b are shown. The dotted boxes 454a-454b may represent a detection by the CNN module 150 of the mouths of the occupants 402a-402b. The dotted box 454a may correspond to the mouth of the driver 402a. The dotted box 454b may correspond to the mouth of the passenger 402b. In the example shown, the detected mouth 454a may be opened. In the example shown, the detected mouth 454b may be closed.

The characteristics of the detected mouths 454a-454b may be detected by the CNN module 150. The characteristics of the detected mouths 454a-454b may be used to determine whether the driver 402a is using the smartphone 408. In one example, the detected open mouth 454a of the driver 402a may be an indicator that the driver 402a is talking (e.g., which may increase a confidence level of detecting that the smartphone 408 is being used).

The processors 106a-106n may analyze video frames captured over an amount of time. For example, in the example video frame 450, the detected mouth 454a may be open, but in a next frame the detected mouth 454a may be closed. In an example, a single frame may not provide sufficient information about the mouth or other characteristics (e.g., the detected mouth 454 may be opened because the driver 402a is yawning, talking, chewing food, etc.). A series (or sequence) of video frames may be analyzed to determine the lip and/or mouth movement. For example, the lips and/or mouth 454a regularly changing between opened and closed may indicate that the driver 402a is talking. In another example, the CNN module 150 may be configured to monitor for particular mouth shapes (e.g., based on the mouth movements used for making particular sounds and/or phonetics of a language). In one example, the memory 108 may store reference mouth shapes that correspond to the phonetics of a language of the current region (e.g., English in the US, English and French in Canada, Italian in Italy, etc.). If the detected mouth 454a is determined to be making mouth movements that correspond to speech, the decision module 158 may determine that the driver 402a is speaking. If the driver 402a is determined to be speaking, a confidence level that the driver 402a is using the smartphone 408 may be increased.

The processors 106a-106n may be configured to detect other conversation indicators. In one example, the computer vision operations performed by the processors 106a-106n may detect nodding by the driver 402a as a conversation indicator (e.g., many people nod while talking on the phone). In another example, the computer vision operations performed by the processors 106a-106n may detect shaking a head and/or hand gestures. The presence of conversation indicators may increase the confidence level that the smartphone 408 is being used. The types of conversation indicators detected may be varied according to the design criteria of a particular implementation.

An electronic device 460 is shown. The electronic device 460 may be a smartphone. A dotted box 462 is shown. The dotted box 462 may represent a detected object location corresponding to the smartphone 460. In the example shown, the smartphone 460 may be an electronic device being used by the passenger 402b and not by the driver 402a. The processors 106a-106n may be configured to correlate the location 462 of the smartphone 460 with the location of the passenger 402b. Since the smartphone 460 is being used by the passenger 402b and not being used by the driver 402a, the processors 106a-106n may not generate the notification signal VCTRL. Similarly, the processors 106a-106n may not generate the notification signal VCTRL in response to any other occupants in the ego vehicle 50, other than the driver 402a, that are using an electronic device (e.g., usage of the electronic device 460 by the passenger 402b may not be unauthorized).

Generally, the characteristics of the passenger 402b and/or other occupants may be irrelevant to determining whether the driver 402a is using the smartphone 408. However, in some scenarios, the characteristics of the passenger 402b may be informative to determining whether the driver 402a is using the smartphone 408. In an example, the detected mouth 454b may be analyzed along with the detected mouth 454a to determine whether the driver 402a and the passenger 402b are speaking to each other. If the driver 402a is speaking with the passenger 402b, then the confidence level for usage of the smartphone 408 by the driver 402b may be decreased.

For example, if the characteristics of the detected mouth 454a are determined to be consistent with speaking and the characteristics of the detected mouth 454b are determined to be consistent with not speaking, then the confidence level for usage of the smartphone 408 by the driver 402a may be increased (e.g., only the driver 402a is speaking may indicate that the driver 402a is talking on the phone). In another example, if the characteristics of the detected mouth 454a are determined to be consistent with speaking and the characteristics of the detected mouth 454b are determined to be consistent with speaking, then the confidence level for usage of the smartphone 408 by the driver 402a may be decreased (e.g., the driver 402a and the passenger 402b may be speaking to each other). In an example, the processors 106a-106n may analyze the movement of the detected mouths 454a-454b and determine that the detected mouth 454a may start moving while the detected mouth 454b is not moving, then the detected mouth 454b may start moving while the detected mouth 454a stops moving. The back and forth mouth movement detected over a sequence of video frames may be indicative of a conversation (e.g., one person talks while one person listens, then the person stops talking while the other person responds).

The sensor fusion module 152 may be configured to perform inferences in response to multiple disparate sets of information. The decision module 158 may make a decision in response to the inferences from the sensor fusion module 152. The decision module 158 may analyze the multiple factors in the example video frame 450 (or sequence of video frames) to determine whether there is unauthorized usage of the smartphone 408. In the example shown, the lack of presence of the smartphone 408 may decrease a confidence level of determining an unauthorized use, the orientation and/or characteristics of the detected hand 452 may increase a confidence level of determining an unauthorized use, the characteristics of the detected mouths 454a-454b may increase the confidence level of determining an unauthorized use, etc. The number and/or types of factors taken into account by the decision module 158 may be varied according to the design criteria of a particular implementation.

The CNN module 150 may be configured to implement the dedicated hardware module configured to perform the feature detection to calculate the descriptors. In the example shown, the descriptors may be used by the processors 106a-106n for determining a likelihood that the pixels of the video frame 450 belong to the objects and/or characteristics of the objects (e.g., the detected faces 410a-410b, the detected mouths 454a-454b and the detected hand 452) that correspond to the use of the electronic device 408 by the driver 402a.

Figure 8:
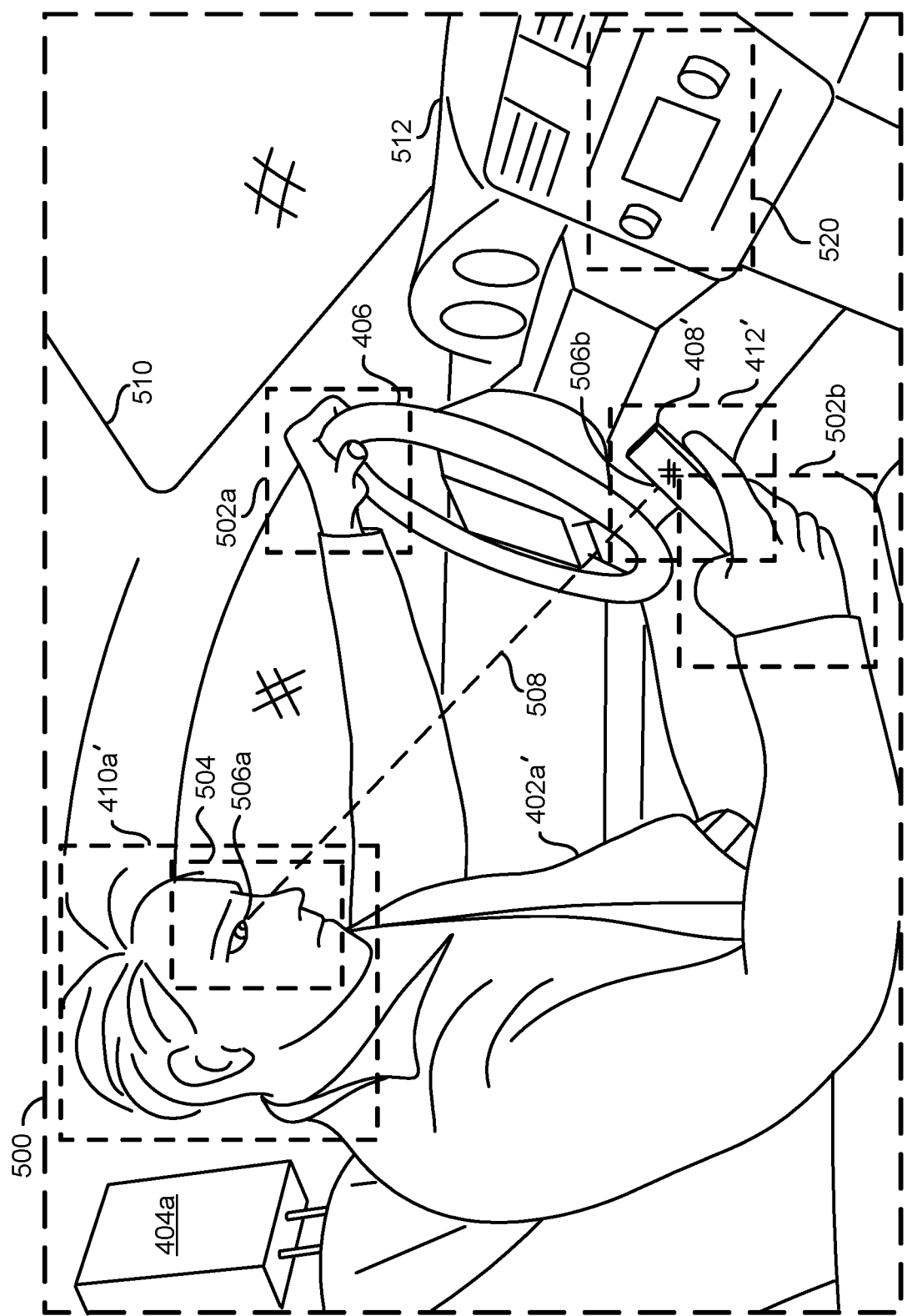
FIG. 8 is a diagram illustrating an example video frame used to detect texting and driving.

Referring to FIG. 8, a diagram illustrating an example video frame 500 used to detect texting and driving is shown. Generally, texting while driving may be a form of unauthorized usage of an electronic device. The example video frame 500 may be a video frame of the interior of the ego vehicle 50 captured by one of the capture devices 102a-102n. The example video frame 500 may be a video frame capturing a front row of seats of the interior of the ego vehicle 50.

The driver 402a' is shown in the video frame 500. The driver seat 404a is shown in the video frame 500. In an example, the driver 402a may be the driver 202 being captured by the capture device 102a as shown in association with FIG. 2. The steering wheel 406 is shown. The electronic device (e.g., smartphone) 408' is shown being held by the driver 402a'. The dotted box 412' is shown indicating that the processors 106a-106n have detected the smartphone 408' in the example video frame 500.

Dotted boxes 502a-502b are shown. The dotted boxes 502a-502b may represent the processors 106a-106n detecting and/or locating the hands of the driver 402a'. The CNN module 150 may be configured to detect the location, orientation and/or characteristics of the detected hands 502a-502b. In the example shown, the defected left hand 502a may be on the steering wheel 406 and the detected right hand may be on a lap of the driver 402a' and holding the smartphone 408'.

A dotted box 504, locations 506a-506b and a line 508 are shown. The dotted box 504 may represent the processors 106a-106n detecting the face direction and/or gaze direction of the driver 402a'. The CNN module 150 may be configured to detect the eyes of the driver 402'. The location 506a may represent a location of the eyes of the driver 402a' (e.g., 3D coordinates corresponding to a horizontal axis, a vertical axis and a depth axis). The line 508 may represent a projected gaze of the driver 402a' determined by the processors 106a-106n. The location 506b may represent an estimated endpoint (e.g., a target) of the gaze 508. The target 506b may be determined based on the projected gaze 508 of the driver 402a'.

The CNN module 150 may be configured to determine an angle of the head of the driver 402'. In the example shown, the detected face 504 may be angled downwards (e.g., not towards a windshield 510). In some embodiments, the angle of the detected face 504 may be sufficient to indicate that the driver 402a' is not looking at the road and/or may be distracted by an electronic device. In another example, the angle of the face may be insufficient to determine where the driver 402a' is looking and the sensor fusion module 152 may provide supplemental data to help make the determination.

In some embodiments, the direction of the gaze 508 of the driver 402a' may be determined based on the location and/or direction of the eyes 506a of the driver 402a'. For example, the location of the eyes 506a may be determined, and a projection may be performed from the location of the eyes 506a to the second location 506b (e.g., a target location) in the video frame 500. In the example shown, the gaze 508 of the driver 402a' may be projected generally towards a target location below a dashboard 512 (e.g., generally towards the smartphone 408'). The processors 106a-106n may determine whether the direction of the gaze 508 (e.g., the target 506b) corresponds with the location of the smartphone 408' in the example video frame 500. Based on the projected gaze 508 of the driver 402a' and/or the angle of the detected face 504, the decision module 158 may determine whether the driver 402a' is performing an unauthorized use of the smartphone 408'.

A dotted box 520 is shown. The dotted box 520 may represent the processors 106a-106n detecting an alternate electronic device in the example video frame 500. The alternate electronic device 520 may be an infotainment system. For example, if the driver 402a' is interacting with the infotainment system 520 while driving, then there may be an unauthorized use of the infotainment system 520 and the processors 106a-106n may generate the response. Whether interacting with the infotainment system 520 is unauthorized may depend on the local rules.

The processors 106a-106n may perform the computer vision operations on the example video frame 500 to determine whether the driver 402a' is performing an unauthorized use of the electronic device (e.g., the smartphone 408' and/or the infotainment system 520). For example, some drivers may attempt to hide usage of the smartphone 408' by keeping the smartphone 408' below the level of the windshield 510 (e.g., on their lap) and glancing downwards to read and/or type text message. Hiding the smartphone 408' below the level of the windshield 510 may prevent traffic enforcement officers from catching the driver 402a' texting but would not prevent the apparatus 100 from providing the notification signal VCTRL.

The sensor fusion module 152 and/or the decision module 158 may be configured to correlate multiple sources of information to determine whether the driver 402a' is texting while driving. In one example, the processors 106a-106n may analyze the location of the detected hands 502a-502b. The detected hand 502a located on the steering wheel 406 may be indicative that the driver 402a' is driving (e.g., as opposed to sitting in a parked car). The orientation of the detected hand 502b combined with the detection 412' of the smartphone 408' may indicate that the driver 402a' is holding the smartphone 408'. The detected hand 502b located below a level of the windshield 510 and the dashboard 512 may indicate that the driver 402a' is attempting to hide the smartphone 408'. Furthermore, the position of the thumb on the detected hand 502b may indicate that the driver 402a' is interacting with the smartphone 408a'. The orientation of the detected face and/or eyes 504 may indicate that the driver 402a' is looking downwards at the smartphone 408' instead of through the windshield 510. In another example, the decision module 158 and/or the sensor fusion module 152 may determine an amount of time that the eyes 504 of the driver 402a' have not been looking at the road. The factors may indicate that the driver 402a' may be performing an unauthorized use of the electronic device 408' and/or 520. In response to the unauthorized use, the processors 106a-106n may generate the signal VCTRL to cause the actuators 116 to perform a response.

Generally, the response for texting and driving may be similar to the responses for speaking on the smartphone 408 while driving. In some embodiments, the communication device 110 may be configured to pair with the smartphone 408' (e.g., via a Bluetooth connection). If the smartphone 408' is paired with the communication device 110, then one of the response performed by the processors 106a-106n may be an automatic reply to a text message. For example, the processors 106a-106n may monitor for incoming messages and prevent the driver 402a' from responding (e.g., by locking an input). The processors 106a-106n may be configured to generate a pre-formatted text message as a response (e.g., "Bob is currently driving and is unable to reply to this text message"). The message provided by the automatic reply may be varied according to the design criteria of a particular implementation.

The perspective of the example video frame 400 (shown in association with FIG. 6), the example video frame 450 (shown in association with FIG. 7) and the example video frame 500 may be an illustrative example. Generally, one or more of the capture devices 102a-102n may be directed to provide a targeted view of the interior of the ego vehicle 50. The locations of the capture devices 102a-102n may be selected based on manufacturer preference and/or other design considerations. Since many drivers hold a phone low while texting, in order to determine whether a driver is texting while driving, the perspective (e.g., field of view) captured by at least one of the capture devices 102a-102n may provide a view of the driver 402a' below a level of the dashboard 512. The perspective captured of the interior of the ego vehicle 50 by one or more of the capture devices 102a-102n may be varied according to the design criteria of a particular implementation.

Figure 9:
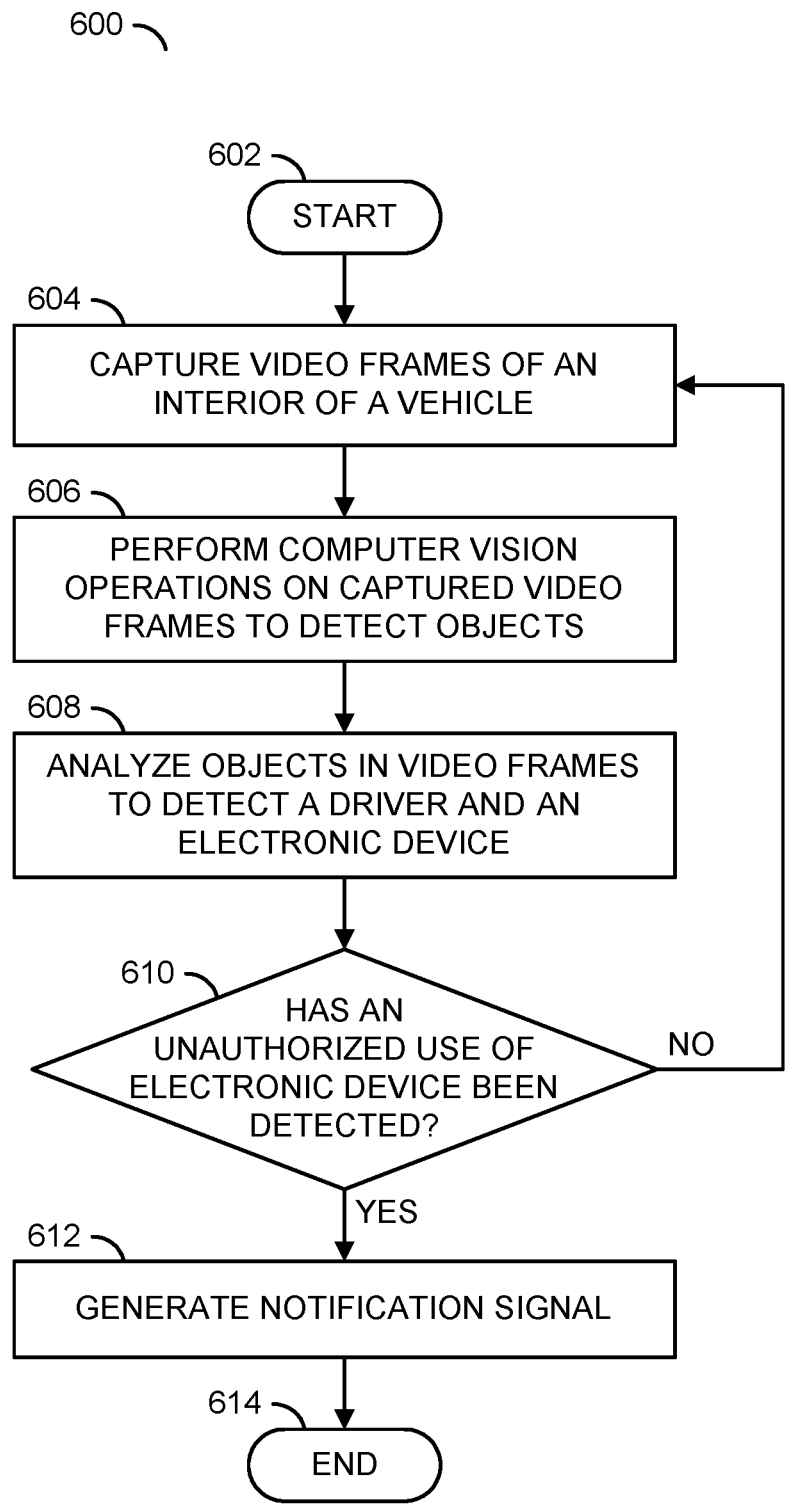
FIG. 9 is a flow diagram illustrating a method for generating a warning in response to unauthorized use of an electronic device.

Referring to FIG. 9, a method (or process) 600 is shown. The method 600 may generate a warning in response to unauthorized use of an electronic device. The method 600 generally comprises a step (or state) 602, a step (or state) 604, a step (or state) 606, a step (or state) 608, a decision step (or state) 610, a step (or state) 612, and a step (or state) 614.

The step 602 may start the method 600. In the step 604, the capture devices 102a-102n may capture the video frames FRAMES_A-FRAMES_N of the interior of the ego vehicle 50. Next, in the step 606, the CNN module 150 of the processors 106a-106n may perform computer vision operations on the captured video frames to detect objects (e.g., the driver 402a, the passenger 402b, the seats 404a-404b, the steering wheel 406, the electronic device 408, etc.). In the step 608, the CNN module 150 may analyze the objects in the captured video frames to detect the driver 402a and the electronic device 408. In an example, the processors 106a-106n may determine characteristics of the driver 402a (e.g., location, body orientation, mouth movements, the gaze 508, etc.). Next, the method 600 may move to the decision step 610.

In the decision step 610, the decision module 158 may determine whether an unauthorized use of the electronic device 408 has been detected. In one example, the unauthorized use may be talking on the smartphone 408 while driving. In another example, the unauthorized use may be texting on the smartphone 408 while driving. In some embodiments, the sensor fusion module 152 may provide information about the status of the vehicle (e.g., driving, stopped, in park, etc.) to determine whether the driver 402a is currently driving. If the decision module 158 determines that there is no unauthorized use, the method 600 may return to the step 604. If the decision module 158 determines that there is an unauthorized use, then the method 600 may move to the step 612.

In the step 612, the processors 106a-106n may generate the notification signal VCTRL. The decision module 158 may determine an appropriate response for the notification signal VCTRL (e.g., warning light, audio message, automatic reply using a connection to the smartphone 408, prevent the driver 402a from driving, prevent the driver from starting the ego vehicle 50, etc.). The interface 104 may communicate the notification signal VCTRL to the appropriate one of the actuators 116 to perform the response. Next, the method 600 may move to the step 614. The step 614 may end the method 600.

Figure 10:
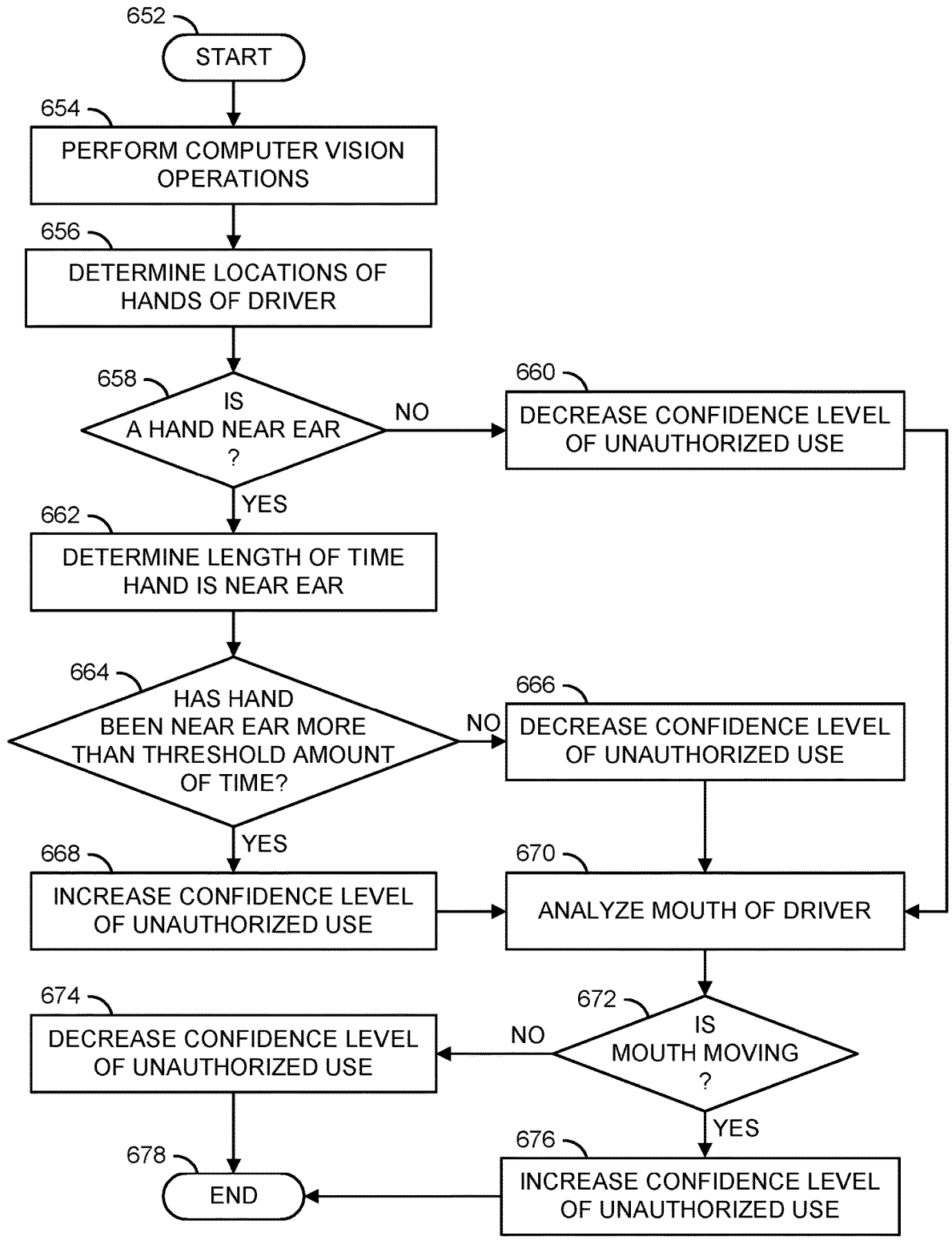
FIG. 10 is a flow diagram illustrating a method for determining whether a driver is talking on a mobile phone.

Referring to FIG. 10, a method (or process) 650 is shown. The method 650 may determine whether a driver is talking on a mobile phone. The method 650 generally comprises a step (or state) 652, a step (or state) 654, a step (or state) 656, a decision step (or state) 658, a step (or state) 660, a step (or state) 662, a decision step (or state) 664, a step (or state) 666, a step (or state) 668, a step (or state) 670, a decision step (or state) 672, a step (or state) 674, a step (or state) 676, and a step (or state) 678.

The step 652 may start the method 650. Next, in the step 654, the processors 106a-106n may perform the computer vision operations on the captured video frames FRAMES_A-FRAMES_N. In the step 656, the processors 106a-106n may determine the location of the detected hands 502a-502b of the driver 402a. Next, the method 650 may move to the decision step 658.

In the decision step 658, the processors 106a-106n may determine whether the detected hands 502a-502b are near the ear of the detected head 410a of the driver 402a. If one of the hands 502a-502b are not near the ear, the method 650 may move to the step 660. In the step 660, the decision module 158 may decrease a confidence level of unauthorized use (e.g., the driver 402a is less likely to be talking on the phone if the phone 408 is not near an ear). Next, the method 650 may move to the step 670.

In the decision step 658, if one of the hands 502a-502b is near the ear, the method 650 may move to the step 662. In the step 662, the processors 106a-106n may determine the length of time that the detected one of the hands 502a-502b is near the ear. For example, the CNN module 150 may perform the computer vision operations on a sequence of the video frames and the processors 106a-106n may determine the length of time based on the frame rate and the number of frames that one of the hands 502a-502b is near the ear. Next, the method 650 may move to the decision step 664.

In the decision step 664, the processors 106a-106n may determine whether one of the hands 502a-502b has been near the ear for more than the threshold amount of time (e.g., TS). The threshold amount of time TS may be a predetermined amount of time determined based on statistical information about how long people perform particular actions (e.g., how long people rest their head on their hand, how long people use the phone, etc.). If the hand has not been near the ear for more than the threshold amount of time TS, then the method 650 may move to the step 666. In the step 666, the decision module 158 may decrease a confidence level of unauthorized use (e.g., the driver 402a is less likely to be talking on the phone if the hand is near the ear for only a short amount of time). Next, the method 650 may move to the step 670.

In the decision step 664, if the hand has been near the ear for more than the threshold amount of time TS, then the method 650 may move to the step 668. In the step 668, the decision module 158 may increase a confidence level of unauthorized use. Next, the method 650 may move to the step 670. In the step 670, the processors 106a-106n may analyze the detected mouth 454a of the driver 402a. Next, the method 650 may move to the decision step 672.

In the decision step 672, the processors 106a-106n may determine whether the detected mouth 454a is moving. If the detected mouth 454a is not moving, then the method 650 may move to the step 674. In the step 674, the decision module 158 may decrease a confidence level of unauthorized use (e.g., the driver 402a is less likely to be talking on the phone if the mouth is not moving). Next, the method 650 may move to the step 678. In the decision step 672, if the detected mouth 454a is moving, the method 650 may move to the step 676. In the step 676, the decision module 158 may increase a confidence level of unauthorized use. Next, the method 650 may move to the step 678. The step 678 may end the method 650.

The aggregated confidence level (e.g., a summation of all the increases and decreases of the confidence level after weighting is performed based on the particular factor) may be used by the decision module 158 to make a determination of whether there has been an unauthorized use of the electronic device 408. In one example, the detected phone 412 near the ear of the driver 402a may be strong evidence of unauthorized use (e.g., strong evidence may have a higher weighting factor when aggregating the confidence level). In another example, detecting the hand near the ear when the phone is not visible may be weak evidence of unauthorized use (e.g., weak evidence may have a lower weighting factor when aggregating the confidence level).

Figure 11:
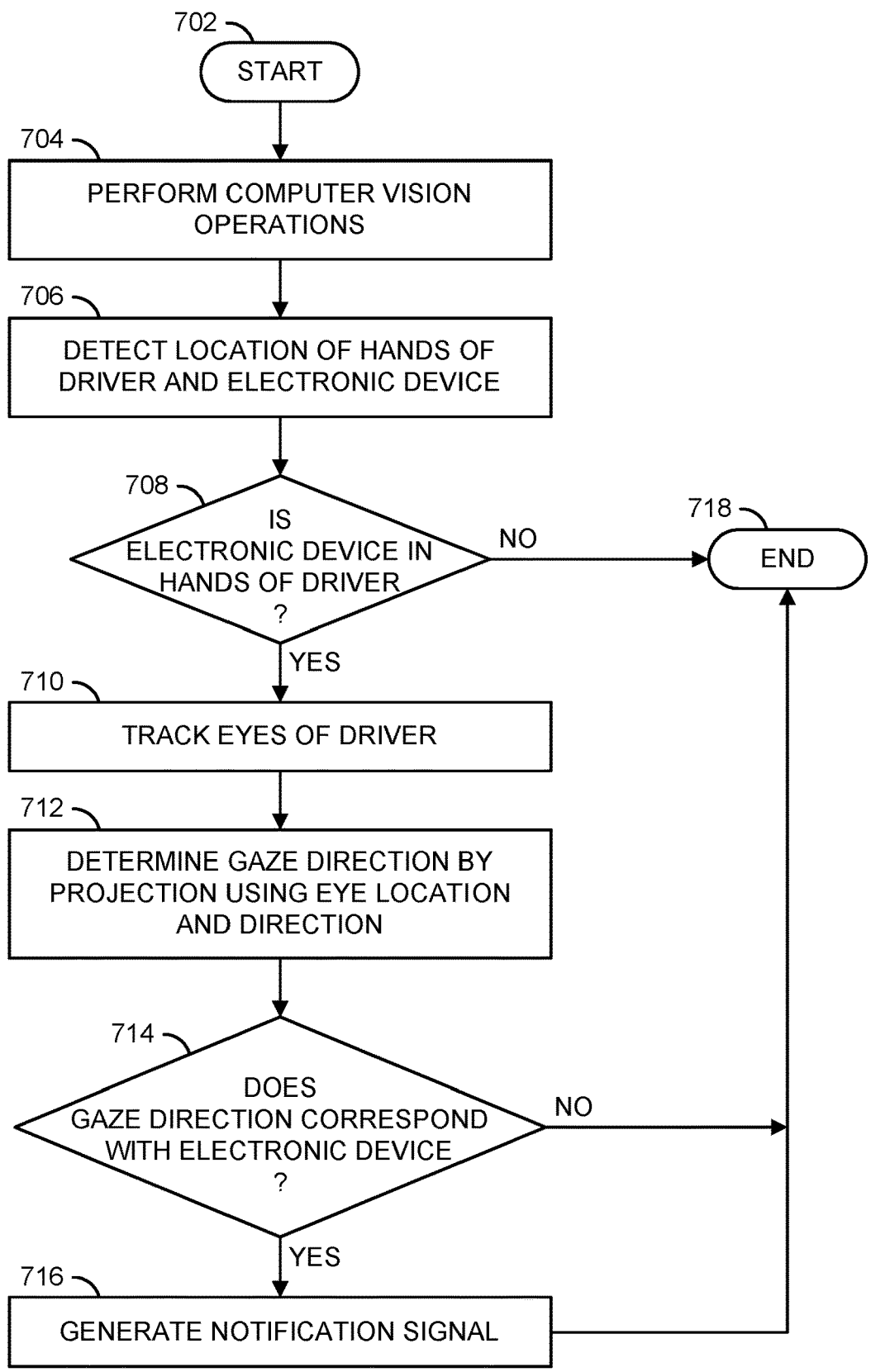
FIG. 11 is a flow diagram illustrating a method for determining whether a driver is texting while driving.

Referring to FIG. 11, a method (or process) 700 is shown. The method 700 may determine whether a driver is texting while driving. The method 700 generally comprises a step (or state) 702, a step (or state) 704, a step (or state) 706, a decision step (or state) 708, a step (or state) 710, a step (or state) 712, a decision step (or state) 714, a step (or state) 716, and a step (or state) 718.

The step 702 may start the method 700. Next, in the step 704, the processors 106a-106n may perform the computer vision operations on the video frames FRAMES_A-FRAMES_N. In the step 706, the CNN module 150 may detect the location of the detected hands 502a-502b and the detected electronic device 412. Next, the method 700 may move to the decision step 708.

In the decision step 708, the processors 106a-106n may determine whether the electronic device 408 is in one of the hands 502a-502b of the driver 402a. In an example, the processors 106a-106n may cross-reference the location coordinates of the hands 502a-502b with the location coordinates of the detected device 412. If the location of one of the detected hands 502a-502b is within a pre-determined range of distances from the detected device 412, then the decision module 158 may determine that the driver 402a is holding the smartphone 408. If the electronic device 408 is not in the hands of the driver 402a, then the method 700 may move to the step 718. If the electronic device 408 is in the hands of the driver 402a, then the method 700 may move to the step 710.

In the step 710, the processors 710 may track the eyes of the driver 402a. For example the location and/or direction of the eyes 506a may be detected and/or monitored. Next, in the step 712, the processors 106a-106n may determine the gaze direction 508 by performing a projection based on the location and direction of the eyes 506a and the content of the video frame 500. For example, the gaze projection 508 may be used to determine a target 506b of the gaze 508. Next, the method 700 may move to the decision step 714.

In the decision step 714, the processors 106a-106n may determine whether the gaze direction 508 corresponds with the electronic device 408 (or the infotainment system 520). For example, the processors 106a-106n may determine the gaze target 506b, and cross-reference the gaze target 506b with the electronic device 408. Generally, the gaze direction 508 may be monitored over a sequence of video frames (e.g., to prevent false positives when the driver 402a briefly glances downward or false negatives when the driver 402a briefly glances at the road while texting). If the gaze direction 508 does not correspond with the electronic device 408, the method 700 may move to the step 718. If the gaze direction does correspond with the electronic device 408, then the method 700 may move to the step 716. In the step 716, the processors 106a-106n may generate the notification signal VCTRL. Next, the method 700 may move to the step 718. The step 718 may end the method 700.

Figure 12:
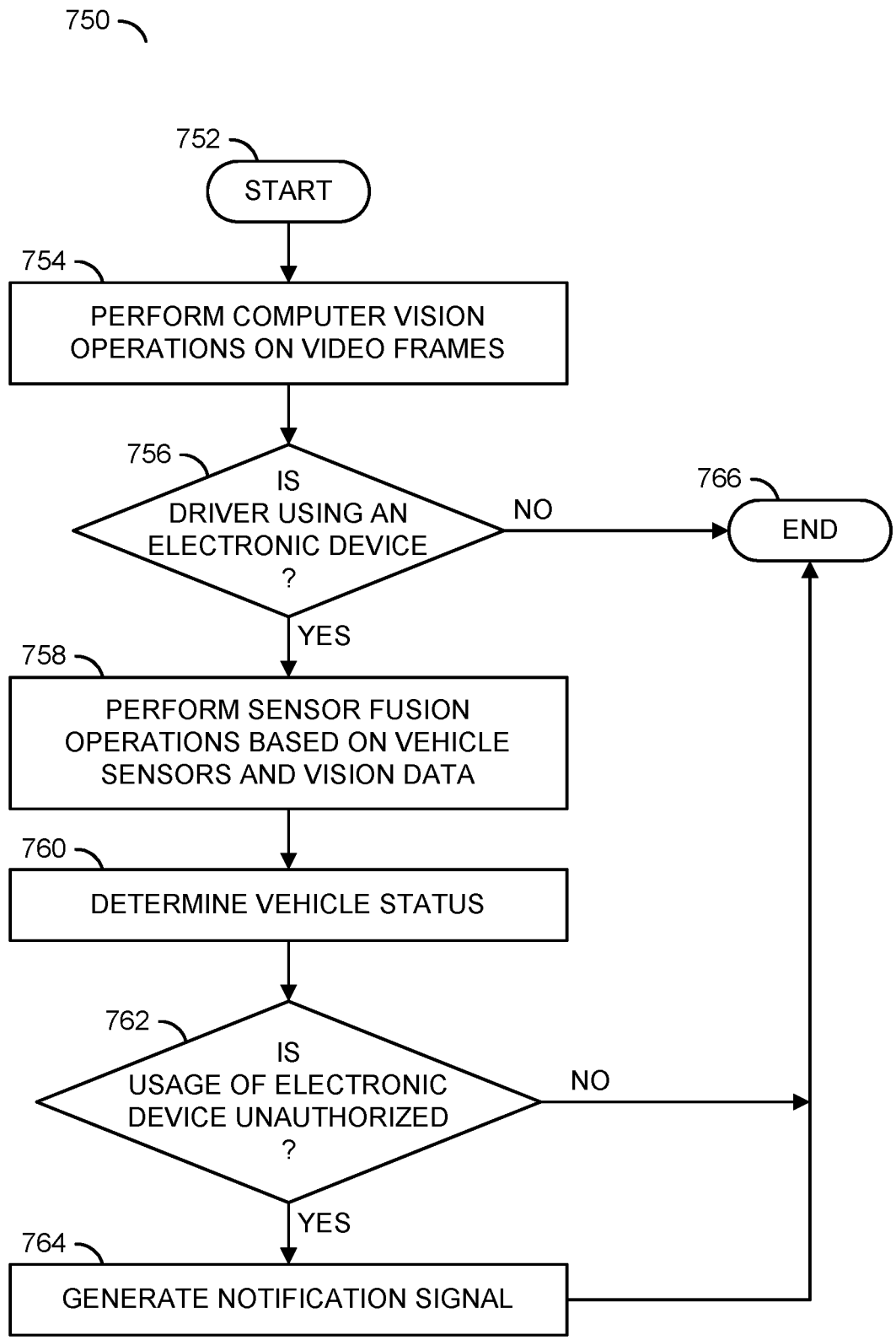
FIG. 12 is a flow diagram illustrating a method for using sensor fusion to prevent false positives.

Referring to FIG. 12, a method (or process) 750 is shown. The method 750 may use sensor fusion to prevent false positives. The method 750 generally comprises a step (or state) 752, a step (or state) 754, a decision step (or state) 756, a step (or state) 758, a step (or state) 760, a decision step (or state) 762, a step (or state) 764, and a step (or state) 766.

The step 752 may start the method 750. In the step 754, the processors 106a-106n may perform the computer vision operations on the video frames FRAMES_A-FRAMES_N. Next, the method 750 may move to the decision step 756.

In the decision step 756, the processors 106a-106n may determine whether the driver 402a is using the electronic device 408. If the driver 402a is not using the electronic device 408, the method 750 may move to the step 766. If the driver 402a is determined to be using the electronic device 408, the method 750 may move to the step 758.

In the step 758, the sensor fusion module 152 may perform sensor fusion operations (e.g., combine data input from disparate sources to make inferences that would not be able to be made from a single source alone), based on the vehicle sensors 114 and the computer vision data from the CNN module 150. Next, the method 750 may move to the step 760. In the step 760, the processors 106a-106n may determine the vehicle status (e.g., driving, parked, engine off, idling, etc.). Next, the method 750 may move to the decision step 762.

In the decision step 762, the decision module 158 may determine whether the use of the electronic device 408 is unauthorized. For example, the use may be unauthorized based on the local rules and/or the status of the ego vehicle 50 (e.g., use of the smartphone 408 by the driver 402a in the ego vehicle 50 while parked may be authorized, but use of the smartphone 408 while driving, or stopped at a stop sign may be unauthorized). If the use is not unauthorized, the method 750 may move to the step 766. For example, the apparatus 100 may determine the driving scenario before providing the notification signal to prevent providing false positives. If the use is unauthorized, the method 750 may move to the step 764. In the step 764, the processors 106a-106n may generate the notification signal VCTRL. Next, the method 750 may move to the step 766. The step 766 may end the method 750.

The functions performed by the diagrams of FIGS. 1-12 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the specification, as will be apparent to those skilled in the relevant art(s). Appropriate software, firmware, coding, routines, instructions, opcodes, microcode, and/or program modules may readily be prepared by skilled programmers based on the teachings of the disclosure, as will also be apparent to those skilled in the relevant art(s). The software is generally executed from a medium or several media by one or more of the processors of the machine implementation.

The invention may also be implemented by the preparation of ASICs (application specific integrated circuits), Platform ASICs, FPGAs (field programmable gate arrays), PLDs (programmable logic devices), CPLDs (complex programmable logic devices), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The invention thus may also include a computer product which may be a storage medium or media and/or a transmission medium or media including instructions which may be used to program a machine to perform one or more processes or methods in accordance with the invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMS (random access memories), EPROMs (erasable programmable ROMs), EEPROMs (electrically erasable programmable ROMs), UVPROMs (ultra-violet erasable programmable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, cloud servers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, audio storage and/or audio playback devices, video recording, video storage and/or video playback devices, game platforms, peripherals and/or multi-chip modules. Those skilled in the relevant art(s) would understand that the elements of the invention may be implemented in other types of devices to meet the criteria of a particular application.

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

While the invention has been particularly shown and described with reference to embodiments thereof, it will be understood by those skilled in the art that various changes in form and details may be made without departing from the scope of the invention.

The invention claimed is:

1. An apparatus comprising:
   an interface configured to receive pixel data corresponding to an interior of a vehicle; and
   a processor configured to (i) process said pixel data arranged as video frames, (ii) perform video operations on said video frames to detect objects in said video frames, (iii) detect a driver based on said objects detected in said video frames, (iv) detect a use of an electronic device by said driver in response to a confidence level and (v) generate a notification signal, wherein
   (a) said notification signal is configured to warn said driver about using said electronic device in said vehicle,
   (b) said notification signal is generated if said use of said electronic device is unauthorized,
   (c) said processor comprises a plurality of dedicated hardware modules implemented as components in said processor,
   (d) a first of said plurality of dedicated hardware modules is configured to perform feature detection to calculate descriptors for determining a likelihood that pixels of said video frames belong to factors that adjust said confidence level that said objects correspond to said use of said electronic device by said driver,
   (e) a second of said plurality of dedicated hardware modules is a video processing pipeline configured to perform video encoding operations,
   (f) said first of said plurality of dedicated hardware modules enables a comparison of said pixels of said video frames to reference pixels of reference video frames for said feature detection to be performed in hardware in said processor that generates said video frames,
   (g) said factors that increase said confidence level comprise (i) detecting a hand of said driver close to an ear of said driver for a pre-determined amount of time, (ii) detecting that a mouth of said driver is open, (iii) detecting that said mouth is speaking based on mouth movements and (iv) conversation indicators based on head movements of said driver,
   (h) said factors that decrease said confidence level comprise (i) not detecting said electronic device, (ii) said hand of said driver not near said ear of said driver, (iii) detecting said electronic device held by a passenger of said vehicle and (iv) determining that said mouth movements of said driver corresponds to said driver having a conversation with said passenger, and
   (i) weighting is performed for each of said factors to perform a summation of increases and decreases of said confidence level based on said factors detected.

2. The apparatus according to claim 1, wherein said first of said dedicated hardware modules is configured to implement an on-chip convolutional neural network.

3. The apparatus according to claim 1, wherein (a) said electronic device is a cellular phone and (b) said processor is configured to weight said factors for said confidence level of said use of said electronic device by said driver by (i) weighting detecting that said hand of said driver is close to said ear of said driver with a low weight, (ii) weighting detecting that said hand is close to said ear for said predetermined amount of time with a medium weight and (iii) weighting detecting said mouth movements of said driver with a high weight.

4. The apparatus according to claim 3, wherein talking on said cellular phone while driving is said use of said electronic device that is unauthorized.

5. The apparatus according to claim 1, wherein (a) said electronic device is a cellular phone and (b) said processor is configured to increase said confidence level of said use of said electronic device by said driver by detecting said factors comprising (i) detecting said cellular phone in said hand of said driver, and (ii) tracking the eyes of said driver to determine a gaze direction and detecting that said gaze direction corresponds to a location of said cellular phone.

6. The apparatus according to claim 5, wherein texting while driving is said use of said electronic device that is unauthorized.

7. The apparatus according to claim 5, wherein said gaze direction is determined by projecting to a target location in said video frames based on a location and direction of the eyes.

8. The apparatus according to claim 1, further configured to distinguish between said driver of said vehicle and said passenger of said vehicle both captured in one of said video frames, wherein said notification signal is not generated in response to use of one or more electronic devices by said passenger.

9. The apparatus according to claim 1, wherein said processor is configured to determine whether said use of said electronic device is unauthorized based on local rules corresponding to a location of said vehicle.

10. The apparatus according to claim 1, wherein said electronic device is an infotainment system of said vehicle.

11. The apparatus according to claim 1, wherein said processor is configured to determine said conversation with said passenger by (i) detecting said mouth movements of said driver, (ii) detecting second mouth movements of said passenger and (iii) determining whether said mouth movements of said driver correspond with (a) talking using said electronic device or (b) said driver having said conversation with said passenger based on a back and forth of said mouth movements of said driver and said second mouth movements.

12. The apparatus according to claim 11, wherein said back and forth of said mouth movements of said driver and said second mouth movements of said passenger is analyzed over a sequence of said video frames.

13. The apparatus according to claim 1, wherein said notification signal is configured to generate an audio message.

14. The apparatus according to claim 1, wherein said processor is further configured to perform sensor fusion operations to determine a status of said vehicle.

15. The apparatus according to claim 14, wherein said processor is further configured to determine whether said use of said electronic device is unauthorized based on said status of said vehicle.

16. The apparatus according to claim 1, wherein (i) said interface is further configured to receive exterior pixel data corresponding to an area outside of said vehicle and (ii) said processor is further configured to (a) process said exterior pixel data arranged as exterior video frames, (b) perform said video encoding operations to generate encoded video frames in response to said exterior video frames and (c) present said encoded video frames to a display.

17. The apparatus according to claim 16, wherein said display comprises an electronic mirror.

18. The apparatus according to claim 16, wherein said display comprises an infotainment system of said vehicle.

19. The apparatus according to claim 1, wherein (i) said plurality of dedicated hardware modules are implemented within said processor and (ii) one or more capture devices configured to generate said pixel data are implemented externally from said processor.

* * * * *